US012676153B2

(12) United States Patent
Zhao

(10) Patent No.: US 12,676,153 B2
(45) Date of Patent: Jul. 7, 2026

(54) SPEECH RECOGNITION METHOD AND APPARATUS, ELECTRONIC DEVICE, AND COMPUTER-READABLE STORAGE MEDIUM

(71) Applicant: Alibaba Innovation Private Limited, Singapore (SG)

(72) Inventor: Xiangyu Zhao, Hangzhou (CN)

(73) Assignee: Alibaba Innovation Private Limited, Singapore (SG)

( * ) Notice: Subject to any disclaimer, the term of this patent is extended or adjusted under 35 U.S.C. 154(b) by 155 days.

(21) Appl. No.: 18/642,071

(22) Filed: Apr. 22, 2024

(65) Prior Publication Data

US 2024/0363117 A1      Oct. 31, 2024

(30) Foreign Application Priority Data

Apr. 28, 2023     (CN) .......................... 202310499910.8

(51) Int. Cl.
 *G10L 15/26*          (2006.01)
 *G10L 15/02*          (2006.01)
(52) U.S. Cl.
 CPC .............. *G10L 15/26* (2013.01); *G10L 15/02* (2013.01)
(58) Field of Classification Search
 None
 See application file for complete search history.

(56) References Cited

U.S. PATENT DOCUMENTS

2005/0114119 A1* 5/2005 Oh ...................... G10L 21/0208
                                                              704/E21.009

2009/0030964 A1* 1/2009 Tada ................... G06F 7/49942
                                                              708/607
2013/0114695 A1* 5/2013 Joshi .................... H04N 19/126
                                                              375/240.03
2014/0140519 A1* 5/2014 Shibuya ................. H04R 29/00
                                                              381/56
2017/0004353 A1* 1/2017 Tang .................... G06V 40/168
(Continued)

FOREIGN PATENT DOCUMENTS

CN          113593539 A     11/2021
CN          113808593 A     12/2021
(Continued)

OTHER PUBLICATIONS

Office Action issued in corresponding Chinese Application No. 202310499910.8 on Dec. 6, 2025, (10 pages).
(Continued)

*Primary Examiner* — Neeraj Sharma
(74) *Attorney, Agent, or Firm* — Finnegan, Henderson, Farabow, Garrett & Dunner, LLP

(57)          ABSTRACT

A speech recognition method and apparatus, an electronic device, and a storage medium are provided. The speech recognition method includes: acquiring a to-be-recognized speech fragment; encoding acquired speech data while the to-be-recognized speech fragment is simultaneously acquired, to obtain an encoding result of the to-be-recognized speech fragment; and decoding the encoding result of the to-be-recognized speech fragment to obtain text data corresponding to the to-be-recognized speech fragment. This solution can reduce a delay of speech recognition in a speech recognition device having limited computing resources.

20 Claims, 6 Drawing Sheets

(56)         References Cited

U.S. PATENT DOCUMENTS

| | | | | |
|---|---|---|---|---|
| 2020/0311453 A1* | 10/2020 | Li | .......................... | G06F 18/253 |
| 2021/0118426 A1* | 4/2021 | Li | ............................ | G10L 15/02 |
| 2021/0287354 A1* | 9/2021 | Kumar | .................. | G06T 7/0004 |
| 2022/0030241 A1* | 1/2022 | Toma | .................... | H04N 19/122 |
| 2022/0270587 A1* | 8/2022 | Wu | .......................... | G10L 25/18 |
| 2022/0301550 A1* | 9/2022 | Wei | ......................... | G10L 15/02 |
| 2022/0310073 A1 | 9/2022 | Audhkhasi et al. | | |
| 2022/0375483 A1* | 11/2022 | Lim | ...................... | G10L 19/167 |
| 2023/0027660 A1* | 1/2023 | Ekstrand | ............. | G10L 19/0212 |

FOREIGN PATENT DOCUMENTS

| | | |
|---|---|---|
| CN | 113889076 A | 1/2022 |
| CN | 114155834 A | 3/2022 |

OTHER PUBLICATIONS

Dongning, Guo, "Recognition and Processing System of Air Traffic Control Speech Command," A Dissertation for the Degree of M. Eng., Harbin Engineering University, 87 pages, 2022, translation of abstract only.

\* cited by examiner

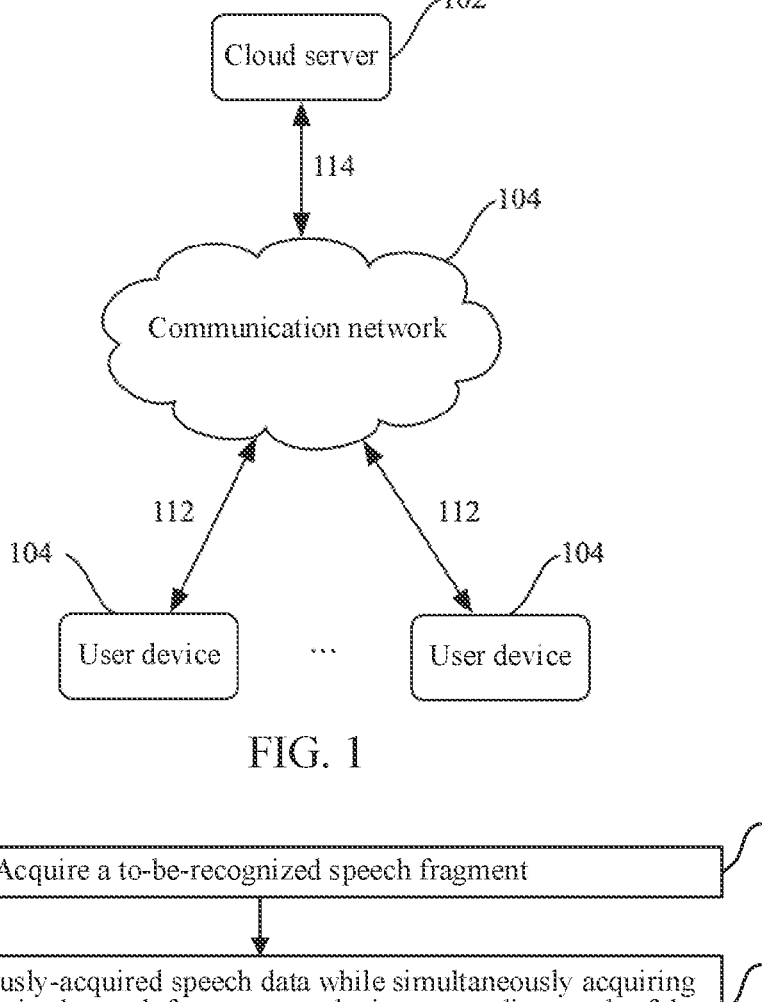

FIG. 1

| |
|---|
| Acquire a to-be-recognized speech fragment |

201

| |
|---|
| Encode previously-acquired speech data while simultaneously acquiring the to-be-recognized speech fragment, to obtain an encoding result of the to-be-recognized speech fragment |

202

| |
|---|
| Decode the encoding result of the to-be-recognized speech fragment to obtain text data corresponding to the to-be-recognized speech fragment |

Multiply a second feature matrix with a weight matrix $W^K$, a weight matrix $W^Q$, and a weight matrix $W^V$ respectively to obtain a third feature matrix K, a third feature matrix Q, and a third feature matrix V ⟋501

Perform a full connection layer operation on the third feature matrix K to obtain a fourth feature matrix K corresponding to a current speech frame ⟋502

Perform a full connection layer operation on the third feature matrix V to obtain a fourth feature matrix V corresponding to the current speech frame ⟋503

Determine an encoding result of the current speech frame based on the third feature matrix Q, the fourth feature matrix K and the fourth feature matrix V corresponding to the current speech frame, and a fourth feature matrix K and a fourth feature matrix V corresponding to a historical speech frame ⟋504

FIG. 5

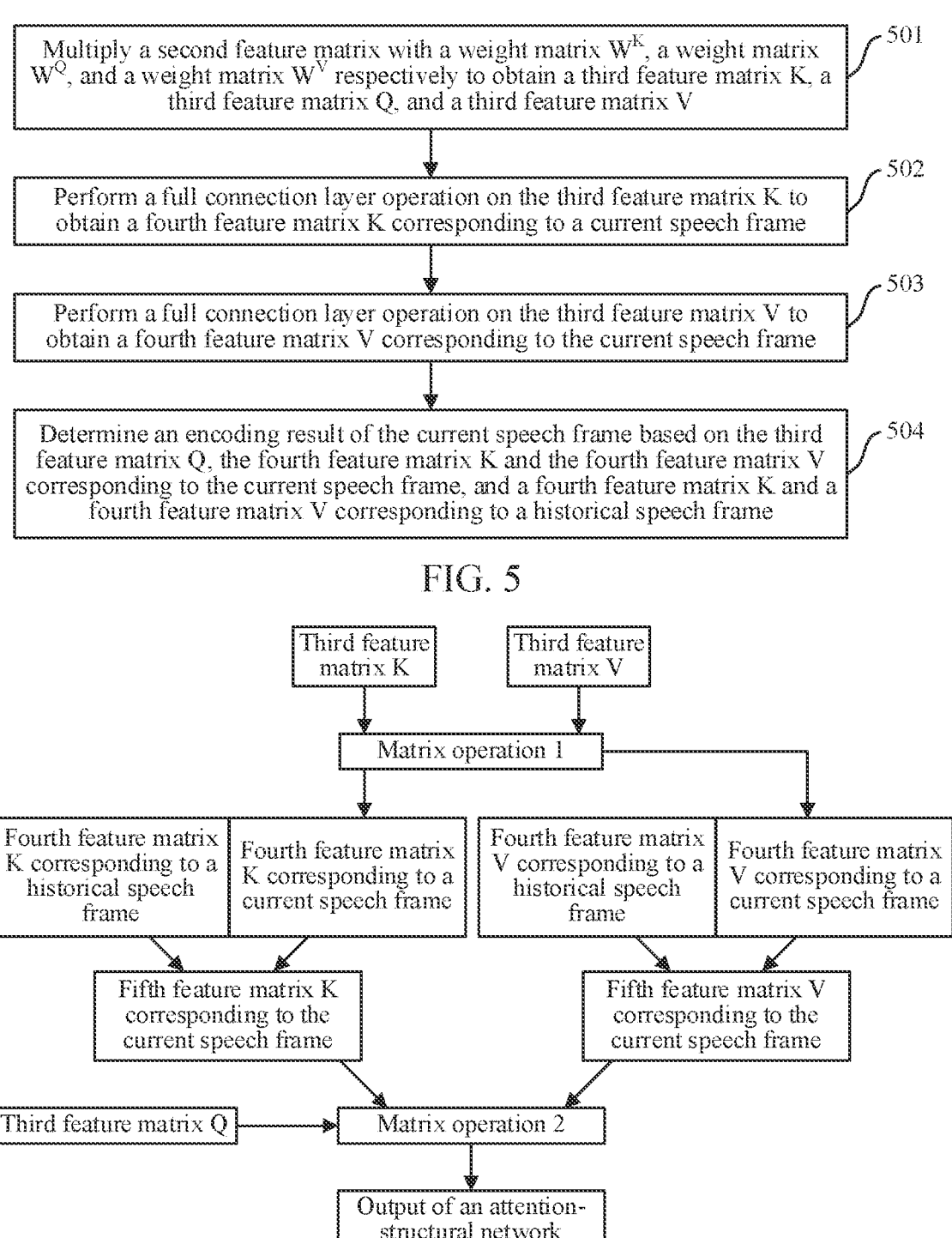

FIG. 6

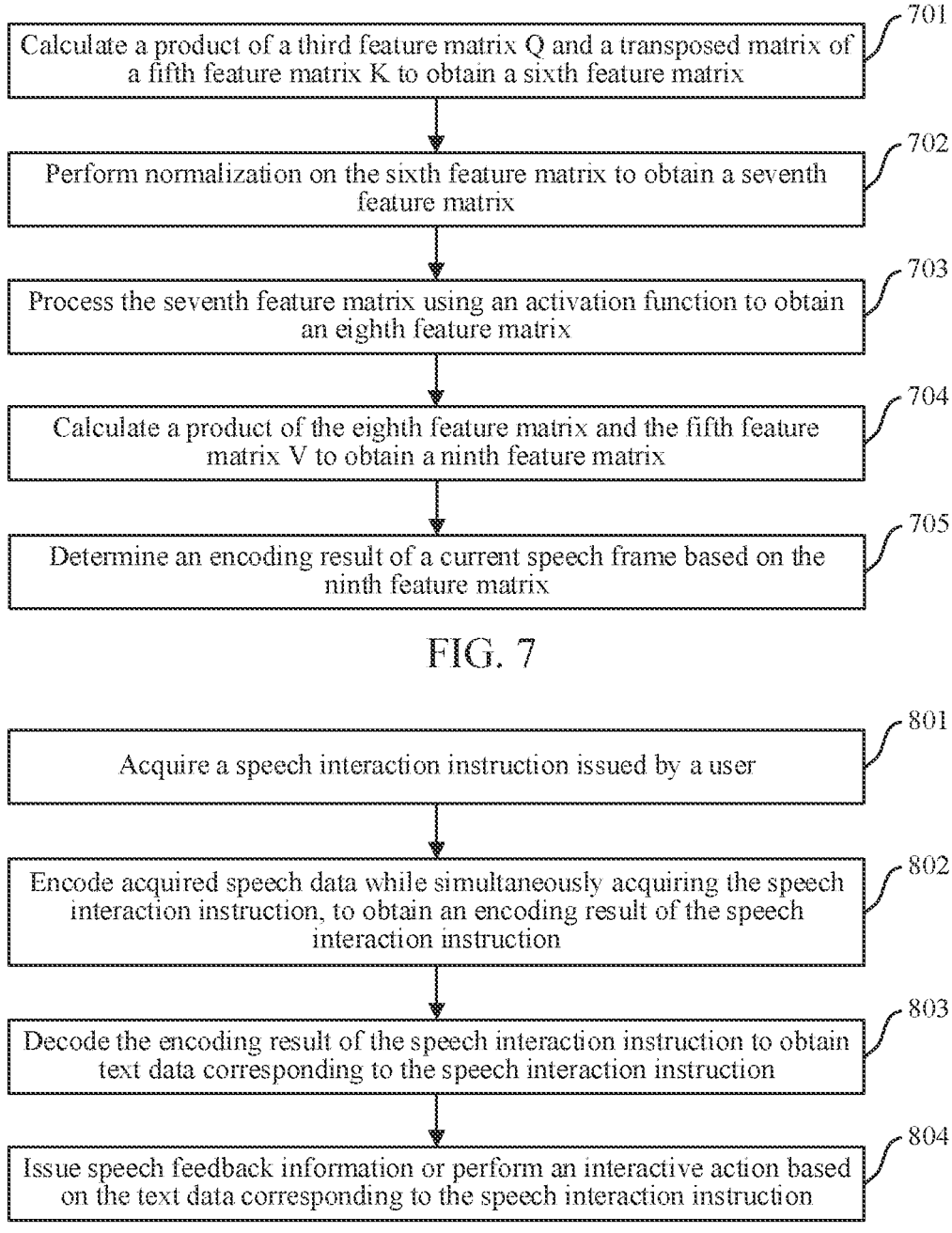

Calculate a product of a third feature matrix Q and a transposed matrix of a fifth feature matrix K to obtain a sixth feature matrix ⟋ 701

Perform normalization on the sixth feature matrix to obtain a seventh feature matrix ⟋ 702

Process the seventh feature matrix using an activation function to obtain an eighth feature matrix ⟋ 703

Calculate a product of the eighth feature matrix and the fifth feature matrix V to obtain a ninth feature matrix ⟋ 704

Determine an encoding result of a current speech frame based on the ninth feature matrix ⟋ 705

FIG. 7

Acquire a speech interaction instruction issued by a user ⟋ 801

Encode acquired speech data while simultaneously acquiring the speech interaction instruction, to obtain an encoding result of the speech interaction instruction ⟋ 802

Decode the encoding result of the speech interaction instruction to obtain text data corresponding to the speech interaction instruction ⟋ 803

Issue speech feedback information or perform an interactive action based on the text data corresponding to the speech interaction instruction ⟋ 804

FIG. 8

SPEECH RECOGNITION METHOD AND APPARATUS, ELECTRONIC DEVICE, AND COMPUTER-READABLE STORAGE MEDIUM

CROSS-REFERENCE TO RELATED APPLICATIONS

The present application claims priority to and the benefits of Chinese Patent Application No. 202310499910.8, filed on Apr. 28, 2023, which is incorporated herein by reference in its entirety.

TECHNICAL FIELD

Embodiments of the present disclosure relate to the field of machine learning technologies, and more particularly, to a speech recognition method, an apparatus, an electronic device, and a storage medium.

BACKGROUND

Automatic speech recognition (ASR) is a technology that converts speeches into texts. And ASR is widely used in devices having speech recognition requirements, such as intelligent conversation robots, smart speakers, advertising machines, and conference translators. ASR is implemented by using a speech recognition model. After feeding speech data into the speech recognition model, the speech recognition model recognizes the speech data as text data and inputs the text data. A common speech recognition model includes an encoder and a decoder. The encoder encodes the speech data to obtain a feature vector. And the decoder decodes the feature vector to obtain the text data.

At present, both the encoder and the decoder are of a non-streaming structure. In other words, a whole sentence needs to be acquired and input into the speech recognition model. The encoder encodes the whole sentence to obtain a feature vector, and the decoder decodes the feature vector to obtain text data.

However, in a speech recognition device having limited computing resources, an encoding process of the encoder and a decoding process of the decoder are time-consuming. Such that it results in a high delay of speech recognition.

SUMMARY

In consideration of the above situation, embodiments of the present disclosure provide a time-domain filtering scheme, to at least partially resolve the foregoing problem.

According to some embodiments of the present disclosure, an electronic device is provided, including: one or more processors, a memory, a communication interface, and a communication bus. The one or more processors, the memory, and the communication interface communicate with each other via the communication bus. The memory is configured to store at least one executable instruction, and the executable instruction enables the one or more processors to cause the electronic device to perform operations corresponding to perform operations that include: acquiring a to-be-recognized speech fragment; encoding acquired speech data while simultaneously acquiring the to-be-recognized speech fragment, to obtain an encoding result of the to-be-recognized speech fragment; and decoding the encoding result of the to-be-recognized speech fragment to obtain text data corresponding to the to-be-recognized speech fragment.

According to some embodiments of the present disclosure, a speech recognition method is provided, including: acquiring a to-be-recognized speech fragment; encoding acquired speech data while simultaneously acquiring the to-be-recognized speech fragment, to obtain an encoding result of the to-be-recognized speech fragment; and decoding the encoding result of the to-be-recognized speech fragment to obtain text data corresponding to the to-be-recognized speech fragment.

According to some embodiments of the present disclosure, a speech interaction method applied to a smart speaker is provided, including: acquiring a speech interaction instruction issued by a user; encoding acquired speech data while simultaneously acquiring the speech interaction instruction, to obtain an encoding result of the speech interaction instruction; decoding the encoding result of the speech interaction instruction to obtain text data corresponding to the speech interaction instruction; and issuing speech feedback information or performing an interactive action based on the text data corresponding to the speech interaction instruction.

BRIEF DESCRIPTION OF THE DRAWINGS

To describe the technical solutions in embodiments of the present disclosure or in the related art more clearly, the following briefly describes the accompanying drawings required for describing the embodiments or the related art. Apparently, the accompanying drawings in the following description show merely a portion of the embodiments of the present disclosure, and a person of ordinary skill in the art may still derive other drawings from the accompanying drawings.

FIG. 1 is a schematic diagram of an example system applied in some embodiments of the present disclosure;

FIG. 2 is a flowchart of an example speech recognition method according to some embodiments of the present disclosure;

FIG. 5 is a flowchart of an example encoding method according to some embodiments of the present disclosure;

FIG. 6 is a schematic diagram of an example encoding process according to some embodiments of the present disclosure;

FIG. 7 is a flowchart of an example encoding method according to some embodiments of the present disclosure;

FIG. 8 is a flowchart of an example speech interaction method according to some embodiments of the present disclosure;

DETAILED DESCRIPTION

Figure 3:
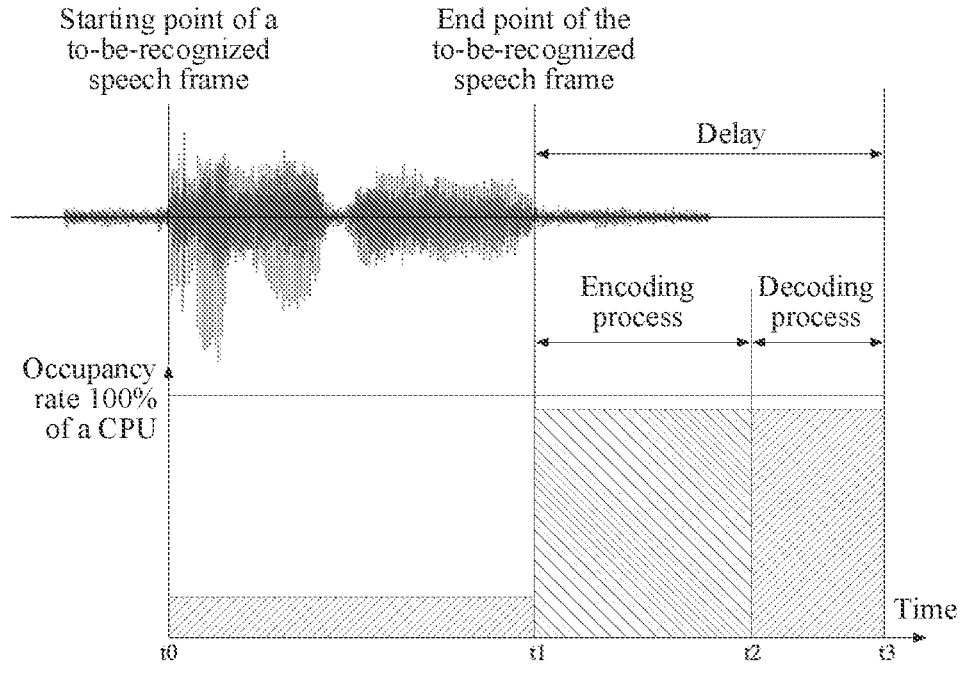
FIG. 3 is a schematic diagram of an example speech recognition process according to some embodiments of the present disclosure.

The following describes the present disclosure based on some embodiments, but the present disclosure is not merely limited to these embodiments. Some specified details are described in the following detailed descriptions of the present disclosure. A person skilled in the art may also fully understand the present disclosure without the descriptions of the details. To prevent the essence of the present disclosure from being confused, well-known methods, procedures, and processes are not described in detail. In addition, the accompanying drawings are not necessarily drawn to scale.

As stated above, in a conventional speech recognition device having limited computing resources, the encoding process of the encoder and a decoding process of the decoder are time-consuming, thereby resulting in a high delay of speech recognition. Embodiments of the present disclosure overcome conventional systems introducing the following, but not limited to, technical improvements.

In some embodiments of the present disclosure, downsampling is performed to encoding processes, so as to reduce the degree of calculations and required computing resources during the encoding processes. As a result, efficiency of performing speech recognition is improved.

In addition, in some embodiments of the present disclosure, the acquired speech data is encoded while simultaneously acquiring the speech interaction instruction. In this way, overlapping of time intervals of performing the speech data acquisition and performing the speech data encoding reduces the time spent at an encoding stage in a speech recognition process. And it correspondingly reduces a delay of speech recognition and improves user experience of performing speech recognition.

FIG. 1 is an example system applicable to a speech recognition method according to some embodiments of the present disclosure. As shown in FIG. 1, the system may include a cloud server 102, a communication network 104, and at least one user device 106. In the example of FIG. 1, a plurality of user devices 106 are shown. It should be noted that the solutions in embodiments of the present disclosure can be applied to both the cloud server 102 and each user device 106.

The cloud server 102 may be any suitable device for storing information, data, programs, or any other suitable type of contents, including but not limited to a distributed storage system device, a server cluster, a computing cloud server cluster, or the like. In some embodiments, the cloud server 102 can perform any appropriate function. For example, in some embodiments, the cloud server 102 can be used for speech recognition. As an optional example, in some embodiments, the cloud server 102 can receive a to-be-recognized speech fragment, and can encode received speech data while simultaneously receiving the to-be-recognized speech fragment, to obtain an encoding result of the to-be-recognized speech fragment. And then the cloud server 102 decodes the encoding result of the to-be-recognized speech fragment to obtain text data corresponding to the to-be-recognized speech fragment.

The communication network 104 may be any suitable combination of one or more wired or wireless networks. For example, the communication network 104 may include any one or more of the following: Internet, Intranet, a wide area network (WAN), a local area network (LAN), a wireless network, a digital subscriber line (DSL) network, a frame relay network, an asynchronous transfer mode (ATM) network, a virtual private network (VPN), or any other suitable communication network. The user device 106 can be connected to the communication network 104 via one or more communication links (for example, a communication link 112). The communication network 104 can be linked to the cloud server 102 via one or more communication links (for example, a communication link 114). The one or more communication links may be any communication link applicable for transferring data between the cloud server 102 and the user device 106, such as a network link, a dial-up link, a radio link, a hardwired link, or any other suitable communication link or any suitable combination of such links.

The user device 106 may include any one or more user devices applicable for interactions. In some embodiments, when the cloud server 102 performs speech recognition, the user device 106 can acquire a to-be-recognized speech fragment and can send acquired speech data to the cloud server 102 in real time via the communication network 104. After obtaining text data corresponding to the to-be-recognized speech fragment, the cloud server 102 can send the text data corresponding to the to-be-recognized speech fragment to a corresponding user device 106 via the communication network 104. In some other embodiments, the user device 106 can perform speech recognition locally. The user device 106 acquires a to-be-recognized speech fragment, encodes acquired speech data while simultaneously acquiring the to-be-recognized speech fragment to obtain an encoding result of the to-be-recognized speech fragment, and then decodes the encoding result of the to-be-recognized speech fragment to obtain text data corresponding to the to-be-recognized speech fragment. In some embodiments, after obtaining the text data corresponding to the to-be-recognized speech fragment by decoding, the user device 106 may further send the text data corresponding to the to-be-recognized speech fragment to the cloud server 102 via the communication network 104. The user device 106 may include any suitable type of device. For example, the user device 106 may include a mobile device, a tablet computer, a laptop computer, a desktop computer, a wearable computer, a vehicle system, a smart speaker, an advertising machine, various Internet of Things (IoT) devices including a microcontroller unit (MCU), or any other suitable type of user device.

Some embodiments of the present disclosure mainly focus on a speech recognition process performed by the cloud server 102 or the user device 106. The speech recognition process is described in detail below.

Based on the foregoing system, some embodiments of the present disclosure provide a speech recognition method. The speech recognition method can be performed by the foregoing cloud server 102 or user device 106. The following uses a plurality of embodiments to describe the speech recognition method in detail.

FIG. 2 is a flowchart of a speech recognition method according to some embodiments of the present disclosure. As shown in FIG. 2, the speech recognition method includes the following steps.

Step 201: Acquire a to-be-recognized speech fragment.

The to-be-recognized speech fragment is unitary input data for performing speech recognition. During the speech recognition, because there is relevance in context of a speech content, for ensuring the accuracy of a recognition result, the speech recognition needs to be performed using a to-be-recognized speech fragment that incorporates a contextual relationship as a unit. The to-be-recognized speech fragment may be a whole sentence.

Step 202: Encode acquired speech data while simultaneously acquiring the to-be-recognized speech fragment, to obtain an encoding result of the to-be-recognized speech fragment.

Because it takes a period of time to acquire the to-be-recognized speech fragment, acquired speech data can be encoded during acquiring the to-be-recognized speech fragment. In other words, an acquiring process of the to-be-recognized speech fragment is performed simultaneously with an encoding process of the to-be-recognized speech fragment. After the acquisition of the to-be-recognized speech fragment is completed, the encoding for the to-be-recognized speech fragment is immediately completed to obtain the encoding result of the to-be-recognized speech fragment.

A to-be-recognized speech fragment can be expressed in units of speech frames. And the to-be-recognized speech fragment includes a plurality of speech frames. Previous speech frames in the to-be-recognized speech fragment can be encoded while subsequent speech frames in the to-be-recognized speech fragment are simultaneously acquired. For example, if the to-be-recognized speech fragment includes 300 speech frames, an (i−1) th speech frame can be encoded while an $i^{th}$ speech frame is simultaneously acquired, where i is a positive integer greater than or equal to two and less than or equal to 300.

Step 203: Decode the encoding result of the to-be-recognized speech fragment to obtain text data corresponding to the to-be-recognized speech fragment.

After obtaining the encoding result of the to-be-recognized speech fragment, the encoding result can be decoded to obtain the text data corresponding to the to-be-recognized speech fragment. The text data is a result of performing speech recognition on the to-be-recognized speech fragment. In other words, the to-be-recognized speech fragment is an audio representation of contents expressed by a user, and the text data is a text representation of the contents expressed by the user.

It should be understood that encoding of the to-be-recognized speech fragment can be implemented using an encoder included in a speech recognition model. And decoding of the encoding result of the to-be-recognized speech fragment can be implemented using a decoder included in the speech recognition model.

In the related art, both the encoder and the decoder apply non-streaming structures. The non-streaming structure is a data processing structure that needs accumulating a specific amount of input data stream before processing the input data stream. An encoder of a non-streaming structure needs to encode speech data corresponding to a whole sentence. Otherwise, the encoder of the non-streaming structure will cause a speech recognition processing error if the encoder encodes speech data corresponding to merely part of the whole sentence.

After acquiring a complete to-be-recognized speech fragment, the encoder starts encoding the to-be-recognized speech fragment. After the encoder generates an encoding result of the to-be-recognized speech fragment, the decoder decodes the encoding result to obtain text data corresponding to the to-be-recognized speech fragment.

FIG. 3 is a schematic diagram of a speech recognition process in the related art. As shown in FIG. 3, there are a speech acquisition process during a time interval t0-t1, an encoding process during a time interval t1-t2, a decoding process during a time interval t2-t3, and a delay of speech recognition during a time interval (t3-t1). During the speech acquisition process, a CPU's occupancy rate is lower. And the CPU starts to run at a full load at the time t1 when the speech acquisition ends. For a speech recognition device having sufficient computing resources, such as a mobile phone, a personal computer, or a server, the delay of performing the speech recognition can be controlled to be lower, such as (t1-t0)/(t3-t1)>5, and it may indicate that, for example, it may take 1 second to recognize a speech fragment of 5 seconds. However, when a speech recognition algorithm is deployed in an MCU-level chip having limited computing resources, such as 1< (t1-t0)/(t3-t1)<1.5, it may indicate that, for example, it takes at least 3.3 seconds to recognize the speech fragment of 5 seconds. For example, when a length of the time interval (t3-t1)>1.5 seconds, a user can feel a clear sense of pause.

Figure 4:
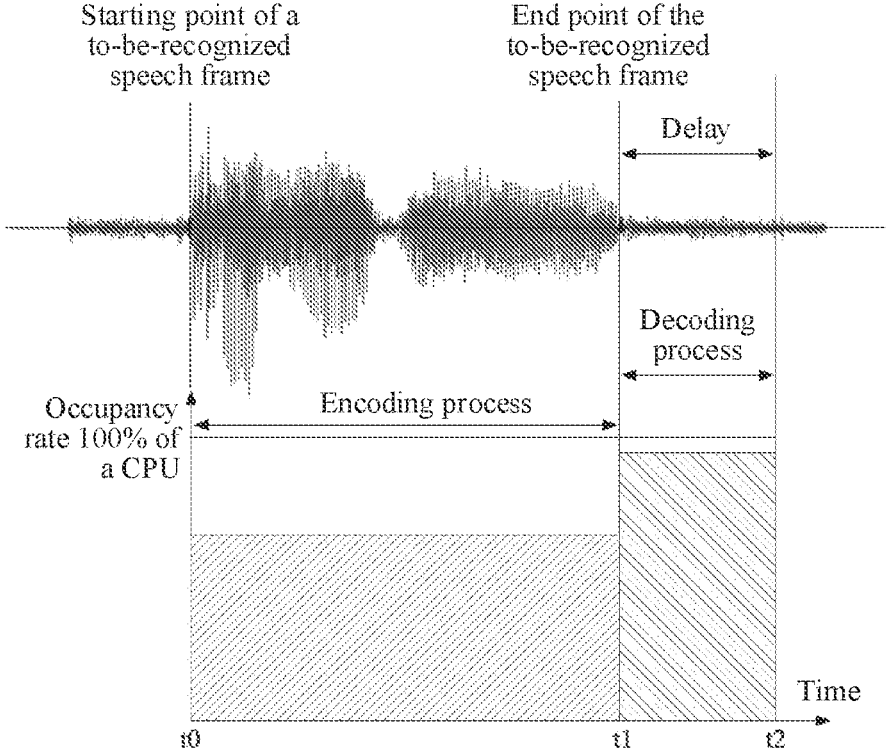
FIG. 4 is a schematic diagram of an example speech recognition process according to some embodiments of the present disclosure.

FIG. 4 is a schematic diagram of a speech recognition process according to some embodiments of the present disclosure. As shown in FIG. 4, while acquiring speech data during the time interval t0-t1, the acquired speech data is simultaneously encoded. In other words, the encoder can parse an audio stream in real time. The decoding process is performed during the time interval t1-t2, and a delay of speech recognition is during the time interval (t2-t1). An occupancy rate of a CPU is higher during both the speech acquisition process and the decoding process.

In some embodiments of the present disclosure, acquired speech data is encoded while a to-be-recognized speech fragment is acquired simultaneously, to obtain an encoding result of the to-be-recognized speech fragment, and then the encoding result of the to-be-recognized speech fragment is decoded to obtain text data corresponding to the to-be-recognized speech fragment. In other words, an encoder of a streaming structure and a decoder of a non-streaming structure are used to perform speech recognition, to enable the encoder to parse an audio stream partially in real time, so that computing resources can be fully used during both the speech acquisition stage and the decoding stage. It is noted that a streaming structure is a data processing structure that can process an input data stream in real time. An encoder of the streaming structure can encode an input speech data stream in real time.

In this way, overlapping of time intervals of performing the speech data acquisition and performing the encoding process of speech data reduces the time spent at during encoding stage of the speech recognition process, thereby reduces a delay of performing the speech recognition in a speech recognition device having limited computing resources.

In some embodiments, when encoding the acquired speech data, feature extraction can be performed on an acquired current speech frame to obtain a first feature matrix. Then the first feature matrix is downsampled to obtain a second feature matrix. And an encoding result of the current speech frame is calculated based on the second feature matrix. The encoding result of the to-be-recognized speech fragment is obtained based on encoding results of a plurality of speech frames included in the to-be-recognized speech fragment.

The to-be-recognized speech fragment includes the plurality of speech frames. When encoding the to-be-recognized speech fragment, one single speech frame can be encoded, or a plurality of consecutive speech frames can be encoded. Therefore, the current speech frame can be one acquired speech frame, or can be the plurality of acquired consecutive speech frames. For example, duration of a single speech frame can be 20 microseconds (ms). If the current speech frame includes four consecutive speech frames, duration of the current speech frame can be 80 ms.

Audio data can be converted, by performing feature extraction on the current speech frame, into a matrix that is convenient for performing one or more matrix operations, to obtain the first feature matrix. It is noted that matrix operations include various operations performed using matrices as operating objects. The operations include any combination of any one or more of matrix addition, matrix subtraction, matrix multiplication, matrix transposition, matrix inversion, matrix symmetry, and the like. When performing the feature extraction on the current speech frame, high-dimensional speech data can be mapped to a low-dimensional manifold. And a representation vector of the low-dimensional manifold is the first feature matrix. When the current speech frame includes the plurality of consecutive speech frames, feature extraction may be performed respectively on the plurality of speech frames included in the current speech frame, to obtain a first feature matrix including feature extraction results of the plurality of speech frames.

When downsampling the first feature matrix, the first feature matrix can be convolved based on a preset step size to obtain the second feature matrix that has a smaller amount of data than the first feature matrix has. For example, convolving the first feature matrix with a step size of 2 reduces an amount of data of the first feature matrix to ¼ of that before the convolution. If a feature extraction result of a single speech frame is a vector having a size 1*20, and if a former speech frame includes four consecutive speech frames, then the first feature matrix is a vector having a size 1*80. The second feature matrix is a vector having a size 1*20 obtained by convolving the first feature matrix with a step size of 2.

After downsampling the first feature matrix to obtain the second feature matrix, the encoding result of the current speech frame can be calculated based on the second feature matrix. In other words, the second feature matrix can be used as an input of the encoder, and the second feature matrix is encoded by the encoder to obtain the encoding result of the current speech frame. Because the second feature matrix is obtained by downsampling the first feature matrix, after the encoder encodes the second feature matrix, data normalization and dimension expansion can be performed on an output layer, so that the encoding result output by the encoder has the same dimension as the first feature matrix.

After respectively encoding the plurality of speech frames included in the to-be-recognized speech fragment, the encoding results of the plurality of speech frames can be sequentially spliced to obtain the encoding result of the to-be-recognized speech fragment.

In some embodiments of the present disclosure, because the second feature matrix is obtained by downsampling the first feature matrix, the second feature matrix includes a smaller amount of data than the first feature matrix does. When the second feature matrix is used as the input of the encoder to encode the current speech frame, an amount of calculation can be reduced, and required computing resources during the encoding can thereby be reduced, so that the speech recognition method provided in some embodiments of the present disclosure can be applied to a speech recognition device having limited computing resources. Because of the reduced amount of calculation in the encoding process, encoding time of the last speech frame in the to-be-recognized speech fragment can correspondingly be reduced, thereby reducing time of performing speech recognition and improving efficiency of the speech recognition.

In some embodiments of the present disclosure, when the encoding result of the current speech frame is calculated based on the second feature matrix, the encoding result of the current speech frame can be calculated based on the second feature matrix and an encoding result of a historical speech frame, to ensure accuracy of the encoding result and implement a streaming structure of the encoder.

FIG. 5 is a flowchart of an encoding method according to some embodiments of the present disclosure. As shown in FIG. 5, the encoding method includes the following steps.

Step 501: Multiply a second feature matrix with a weight matrix $W^K$, a weight matrix $W^Q$, and a weight matrix $W^V$ respectively to obtain a third feature matrix K, a third feature matrix Q, and a third feature matrix V.

The weight matrix $W^K$, the weight matrix $W^Q$, and the weight matrix $W^V$ are three predetermined weight matrices. For example, the weight matrix $W^K$, the weight matrix $W^Q$, and the weight matrix $W^V$ can be model parameters formed during training a speech recognition model. A product of the second feature matrix and the weight matrix $W^K$ is calculated to obtain the third feature matrix K. A product of the second feature matrix and the weight matrix $W^Q$ is calculated to obtain the third feature matrix Q. A product of the second feature matrix and the weight matrix $W^V$ is calculated to obtain the third feature matrix V.

Step 502: Perform a full connection layer operation on the third feature matrix K to obtain a fourth feature matrix K corresponding to the current speech frame.

The fourth feature matrix K is obtained by performing the full connection layer operation on the third feature matrix K. And the fourth feature matrix K has a same dimension as the third feature matrix K. For example, if a dimension of the third feature matrix K is 8*176, and a dimension of a full connection matrix is 176*176, then a dimension of the fourth feature matrix K is still 8*176. Ways of performing the full connection layer operation are not limited in embodiments of the present disclosure. Various types of performing full connection layer operation methods in the related art are all applicable for performing the full connection layer operation on the third feature matrix K.

Step 503: Perform a full connection layer operation on the third feature matrix V to obtain a fourth feature matrix V corresponding to the current speech frame.

The fourth feature matrix V is obtained by performing the full connection layer operation on the third feature matrix V. And the fourth feature matrix V has the same dimension as the third feature matrix V. For example, if a dimension of the third feature matrix V is 8*176, and a dimension of a full connection matrix is 176*176, then a dimension of the fourth feature matrix V is still 8*176. Ways of performing the full connection layer operation are not limited in embodiments of the present disclosure. Various types of performing full connection layer operation methods in the related art are all applicable for performing the full connection layer operation on the third feature matrix V.

FIG. 6 is a schematic diagram of an encoding process according to some embodiments of the present disclosure. As shown in FIG. 6, a full connection layer operation is defined as a matrix operation 1. After obtaining the third feature matrix K, the third feature matrix Q, and the third feature matrix V, the matrix operation 1 is respectively performed on the third feature matrix K and the third feature matrix V. Specifically, the matrix operation 1 is performed on the third feature matrix K to obtain a fourth feature matrix K, and the matrix operation 1 is also performed on the third feature matrix V to obtain a fourth feature matrix V.

Step 504: Determine the encoding result of the current speech frame based on the third feature matrix Q, the fourth feature matrix K and the fourth feature matrix V that correspond to the current speech frame, and a fourth feature matrix K and a fourth feature matrix V that correspond to a historical speech frame.

After the fourth feature matrix K and the fourth feature matrix V that correspond to the current speech frame are obtained, the encoding result of the current speech frame is determined based on the third feature matrix Q, the fourth feature matrix K and the fourth feature matrix V that correspond to the current speech frame, and the fourth feature matrix K and the fourth feature matrix V that correspond to the historical speech frame.

For the current speech frame, the historical speech frame is a speech frame acquired before the current speech frame. Because the encoding on speech frames is performed sequentially by following an order of acquiring the speech frames, therefore, when encoding the current speech frame, an encoding result of the historical speech frame is obtained. The historical speech frame can include a plurality of consecutive speech frames. For example, the historical speech frame can sequentially include a speech frame 1, a speech frame 2, a speech frame 3, and a speech frame 4. The speech frame 4 is adjacent to the current speech frame. The fourth feature matrix K and the fourth feature matrix V that correspond to the historical speech frame have a same number of columns as the fourth feature matrix K and the fourth feature matrix V that correspond to the current speech frame have. For example, if dimensions of the fourth feature matrix K and the fourth feature matrix V that correspond to the current speech frame are both 8*176, and if the historical speech frame includes four consecutive speech frames, dimensions of the fourth feature matrix K and the fourth feature matrix V that correspond to the historical speech frame are both 32*176, and a dimension of the third feature matrix Q is 8*176.

In some embodiments of the present disclosure, an encoder can use an attention-structure as a backbone network. A current output of an attention-structural network is not only related to a current input, but also related to a preceding input. Therefore, the encoding result of the current speech frame is determined based on the third feature matrix Q, the fourth feature matrix K and the fourth feature matrix V that correspond to the current speech frame, and the fourth feature matrix K and the fourth feature matrix V that correspond to the historical speech frame. In this way, the speech frames are encoded by incorporating context information to reduce a delay of performing speech recognition as well as ensuring accuracy of speech recognition results.

In some embodiments of the present disclosure, when the encoding result of the current speech frame is determined based on the third feature matrix Q, the fourth feature matrix K and the fourth feature matrix V that correspond to the current speech frame, and the fourth feature matrix K and the fourth feature matrix V that correspond to the historical speech frame, the fourth feature matrix K that corresponds to the current speech frame and the fourth feature matrix K that corresponds to the historical speech frame can be spliced to obtain a fifth feature matrix K, and the fourth feature matrix V that corresponds to the current speech frame and the fourth feature matrix V that corresponds to the historical speech frame can be spliced to obtain a fifth feature matrix V. Then the encoding result of the current speech frame can be determined based on the third feature matrix Q, the fifth feature matrix K, and the fifth feature matrix V.

In an example, if a dimension of the third feature matrix Q is 8*176, dimensions of the fourth feature matrix K and the fourth feature matrix V that correspond to the current speech frame are both 8*176, and dimensions of the fourth feature matrix K and the fourth feature matrix V that correspond to the historical speech frame are both 32*176, then dimensions of the fifth feature matrix K and the fifth feature matrix V are both (32+8)*176.

In some embodiments of the present disclosure, the fourth feature matrix K that corresponds to the current speech frame and the fourth feature matrix K that corresponds to the historical speech frame are spliced to obtain the fifth feature matrix K. And the fourth feature matrix V that corresponds to the current speech frame and the fourth feature matrix V that corresponds to the historical speech frame are spliced to obtain the fifth feature matrix V. Then the encoding result of the current speech frame is determined based on the third feature matrix Q, the fifth feature matrix K, and the fifth feature matrix V. By splicing the fourth feature matrix that corresponds to the current speech frame and the fourth feature matrix that corresponds to the historical speech frame to obtain the fifth feature matrix, the encoding result of the current speech frame is determined. In this way, under the premise of ensuring the accuracy of speech recognition results, matrix operations can be accelerated, and the efficiency of performing speech recognition can be improved.

In some embodiments of the present disclosure, as shown in FIG. 6, the fourth feature matrix K that corresponds to the current speech frame and the fourth feature matrix K that corresponds to the historical speech frame are spliced to obtain the fifth feature matrix K, and the fourth feature matrix V that corresponds to the current speech frame and the fourth feature matrix V that corresponds to the historical speech frame are spliced to obtain the fifth feature matrix V. Then, a matrix operation 2 is performed on the third feature matrix Q, the fifth feature matrix K, and the fifth feature matrix V to obtain an output of an attention-structural network. Then the encoding result of the current speech frame can be determined based on the output of the attention-structural network. The following describes an example implementation of the matrix operation 2.

FIG. 7 is a flowchart of an encoding method according to some embodiments of the present disclosure. As shown in FIG. 7, the encoding method includes the following steps.

Step 701: Calculate a product of the third feature matrix Q and a transposed matrix of the fifth feature matrix K to obtain a sixth feature matrix.

After calculating the transposed matrix of the fifth feature matrix K, calculate the product of the third feature matrix Q and the obtained transposed matrix of the fifth feature matrix K to obtain the sixth feature matrix. In an example, if a dimension of the third feature matrix Q is 8*176, and a dimension of the fifth feature matrix K is 40*176, then a dimension of the transposed matrix of the fifth feature matrix K is 176*40, and a dimension of the sixth feature matrix is 8*40.

Step 702: Perform normalization on the sixth feature matrix to obtain a seventh feature matrix.

Normalization is performed on the sixth feature matrix based on a preset normalization parameter to obtain the seventh feature matrix. When normalizing the sixth feature matrix, divide the sixth feature matrix by $\sqrt{d_k}$ to obtain the seventh feature matrix, where $d_k$ is the normalization parameter. When the dimension of the third feature matrix Q is 8*176, and when the dimension of the fifth feature matrix K is 40*176, the normalization parameter $d_k$ can be 176.

Step 703: Process the seventh feature matrix using an activation function to obtain an eighth feature matrix.

The activation function used for processing the seventh feature matrix can be a normalization exponential function (softmax).

Step 704: Calculate a product of the eighth feature matrix and the fifth feature matrix V to obtain a ninth feature matrix.

When the dimension of the third feature matrix Q is 8*176, and when the dimension of the fifth feature matrix K is 40*176, the dimension of the sixth feature matrix is 8*40, a dimension of the seventh feature matrix is 8*40, a dimension of the eighth feature matrix is 8*40, and a dimension of the ninth feature matrix is 8*176. In other words, the ninth feature matrix has the same dimension as the third feature matrix has.

Step 705: Determine the encoding result of the current speech frame based on the ninth feature matrix.

An encoder can include a plurality of superimposed attention-structural networks, in which an output of a preceding-stage attention-structural network is used as an input of a subsequent-stage attention-structural network. If a current-stage attention-structural network is the last-stage attention-structural network, perform full connection layer operation on the ninth feature matrix to obtain the encoding result of the current speech frame. If the current-stage attention-structural network is not the last-stage attention-structural network, the ninth feature matrix is used as a second feature matrix of a next-stage attention-structural network.

In some embodiments of the present disclosure, a series of processing including matrix multiplication, normalization, and an activation function are performed based on the third feature matrix Q, the fifth feature matrix K, and the fifth feature matrix V. In this way, speech features of the current speech frame and the historical speech frame are fully extracted to obtain the encoding result of the current speech frame. Such that the encoding result of the current speech frame is ensured to match contents expressed by a user, and accuracy of speech recognition is thus improved.

In some embodiments of the present disclosure, when determining the encoding result of the current speech frame, because the fourth feature matrix K and the fourth feature matrix V that correspond to the historical speech frame need to be used, the fourth feature matrix K that corresponds to the historical speech frame can be loaded from a first cache, and the fourth feature matrix V that corresponds to the historical speech frame can be loaded from a second cache.

The first cache caches a fourth feature matrix K that corresponds to at least one speech frame. The second cache caches a fourth feature matrix V that corresponds to at least one speech frame. The fourth feature matrix K and the fourth feature matrix V that correspond to a same speech frame are respectively cached in the first cache and the second cache.

In an example, fourth feature matrices K and fourth feature matrices V that correspond to one or more speech frames that are acquired before the current speech frame are respectively cached in the first cache and the second cache. When caching a fourth feature matrix that corresponds to a speech frame, the speech frame is adjacent to the current speech frame in a to-be-recognized speech fragment. When caching fourth feature matrices that correspond to a plurality of speech frames, the plurality of speech frames are sequentially consecutive in the to-be-recognized speech fragment, and the last speech frame is adjacent to the current speech frame.

When loading the fourth feature matrix K that corresponds to the historical speech frame, fourth feature matrices K that correspond to speech frames cached in the first cache can be loaded. Then the plurality of loaded fourth feature matrices K can be sequentially spliced to be fourth feature matrices K that correspond to historical speech frames. When loading the fourth feature matrix V that corresponds to the historical speech frames, fourth feature matrices V that correspond to the speech frames cached in the second cache can be loaded. Then the plurality of loaded fourth feature matrices V can be sequentially spliced to be fourth feature matrices V that correspond to the historical speech frames.

In some embodiments of the present disclosure, circuitry of the encoder is configured to include a first cache and a second cache. The first cache is used for caching the fourth feature matrix K that corresponds to the historical speech frame. And the second cache is used for caching the fourth feature matrix V that corresponds to the historical speech frame. Such that the encoder can be of a streaming structure to parse an audio stream in real time.

In some embodiments of the present disclosure, after the fourth feature matrix K and fourth feature matrix V that correspond to the current speech frame are obtained, the fourth feature matrix K that corresponds to the current speech frame is cached in the first cache, and the fourth feature matrix V that corresponds to the current speech frame is cached in the second cache.

Each of the first cache and the second cache has a capacity limit. When the first cache's capacity is fully filled, a new fourth feature matrix K overwrites a fourth feature matrix K that has been cached for the longest time in the first cache. When the second cache's capacity is fully filled, a new fourth feature matrix V overwrites a fourth feature matrix V that has been cached for the longest time in the second cache. Because the fourth feature matrices K and V that correspond to the speech frames are respectively cached to the first cache and the second cache according to an acquisition sequence of the speech frames, the first cache caches fourth feature matrices K corresponding to a plurality of speech frames prior to the current speech frame, and the second cache caches fourth feature matrices V corresponding to the plurality of speech frames prior to the current speech frame.

In some embodiments of the present disclosure, after obtaining the fourth feature matrix K and the fourth feature matrix V that correspond to the current speech frame, the fourth feature matrix K corresponding to the current speech frame is cached into the first cache, and the fourth feature matrix V corresponding to the current speech frame is cached into the second cache. In this way, when encoding a subsequent speech fragment in the to-be-recognized speech fragment, the fourth feature matrix K corresponding to the current speech frame can be loaded from the first cache and used as the fourth feature matrix K corresponding to the historical speech frame, and the fourth feature matrix V corresponding to the current speech frame can be loaded from the second cache and used as the fourth feature matrix V corresponding to the historical speech frame, so as to implement the encoder of a streaming structure. Furthermore, a delay of speech recognition can be reduced under the premise that accuracy of performing the speech recognition is ensured.

It should be noted that in embodiments of the present disclosure, a matrix operation can be accelerated by using a CPU core having a vector instruction set, such as a reduced instruction set computer-five (RISC-V) and an advanced reduced instruction set (Advanced RISC Machine, ARM).

FIG. 8 is an example flowchart of a speech interaction method according to some embodiments of the present disclosure. The speech interaction method can be applied to a smart speaker. As shown in FIG. 8, the speech interaction method includes the following steps.

Step 801: Acquire a speech interaction instruction issued by a user.

Step 802: Encode acquired speech data while simultaneously acquiring the speech interaction instruction, to obtain an encoding result of the speech interaction instruction.

Step 803: Decode the encoding result of the speech interaction instruction to obtain text data corresponding to the speech interaction instruction.

Step 804: Issue speech feedback information or perform an interactive action based on the text data corresponding to the speech interaction instruction.

The smart speaker can issue the speech feedback information in response to different speech interaction instructions, such as answering a user's questions or playing back music. The smart speaker can further perform interactive actions, such as controlling the brightness of a light, controlling the opening and closing of curtains, or controlling a temperature and a wind speed of an air conditioner.

In some embodiments of the present disclosure, the acquired speech data is encoded while simultaneously acquiring the speech interaction instruction. The encoding result of the speech interaction instruction can be obtained after completing the acquisition of the speech interaction instruction. Then the encoding result of the speech interaction instruction is decoded to obtain the text data corresponding to the speech interaction instruction. Furthermore, the speech feedback information is issued or the interactive action is performed based on the text data corresponding to the speech interaction instruction. An encoder applying a streaming structure and a decoder applying a non-streaming structure are used for performing speech recognition, to enable the encoder to parse an audio stream partially in real time. Such that computing resources of the smart speaker can be fully used during both the speech acquisition stage and the decoding stage. Overlapping of time intervals of performing the speech data acquisition and performing the speech data encoding reduces the time spent at an encoding stage in a speech recognition process. And it correspondingly reduces a delay of speech recognition by the smart speaker and improves user experience.

Figure 9:
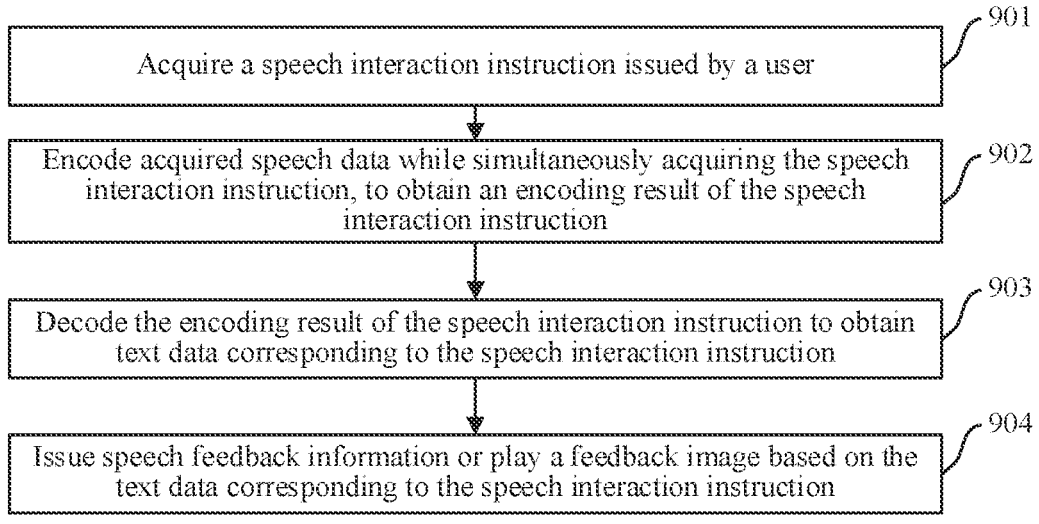
FIG. 9 is a flowchart of an example speech interaction method according to some embodiments of the present disclosure.

FIG. 9 is an example flowchart of a speech interaction method according to some embodiments of the present disclosure. The speech interaction method is applied to an advertising machine. As shown in FIG. 9, the speech interaction method includes the following steps.

Step 901: Acquire a speech interaction instruction issued by a user.

Step 902: Encode acquired speech data while simultaneously acquiring the speech interaction instruction, to obtain an encoding result of the speech interaction instruction.

Step 903: Decode the encoding result of the speech interaction instruction to obtain text data corresponding to the speech interaction instruction.

Step 904: Issue speech feedback information or play back a feedback image based on the text data corresponding to the speech interaction instruction.

The advertising machine can issue the speech feedback information in response to different speech interaction instructions, such as playing back advertising audio of a related product or playing back prompt voice that prompts a user to try out. The advertising machine can also play back a feedback image, such as playing back advertising pictures or advertising videos via a display screen.

In some embodiments of the present disclosure, the acquired speech data is encoded while simultaneously acquiring the speech interaction instruction. The encoding result of the speech interaction instruction can be obtained after completing the acquisition of the speech interaction instruction. Then the encoding result of the speech interaction instruction is decoded to obtain the text data corresponding to the speech interaction instruction. And the speech feedback information is issued or the feedback image is played back based on the text data corresponding to the speech interaction instruction. An encoder applying a streaming structure and a decoder applying a non-streaming structure are used for performing speech recognition, so as to enable the encoder to parse an audio stream partially in real time. Such that computing resources of the advertising machine can be fully used at both a speech acquisition stage and a decoding stage. Overlapping of time intervals of performing the speech data acquisition and performing the speech data encoding reduces the time spent at an encoding stage in a speech recognition process. And it correspondingly reduces a delay of performing the speech recognition by the advertising machine and improves user experience.

It should be noted that because the speech interaction method in some embodiments of the present disclosure can be implemented based on the speech recognition method in some embodiments of the present disclosure, the speech interaction method in some embodiments of the present disclosure can be specific applications of the speech recognition method in some embodiments of the present disclosure. The speech interaction method is not only applicable to the smart speaker and the advertising machine, but also applicable to other speech recognition devices having limited computing resources. Implementations of the speech interaction method can be referred to at least descriptions in the foregoing embodiments of the speech recognition method. Details are not repeatedly described herein.

Figure 10:
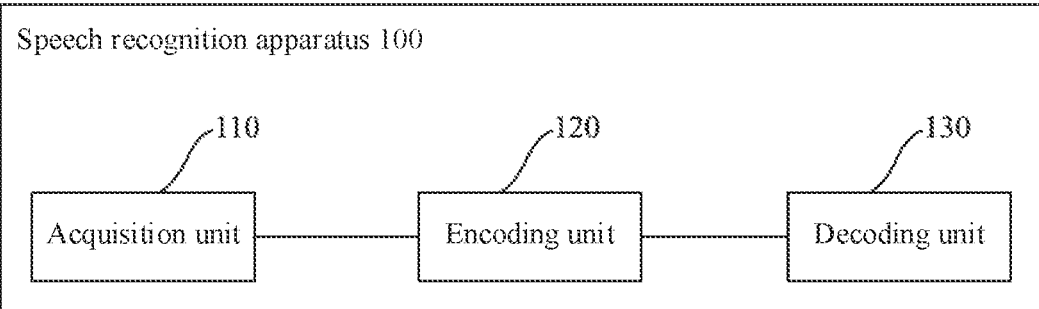
FIG. 10 is a schematic diagram of an example speech recognition apparatus according to some embodiments of the present disclosure.

For the foregoing speech recognition method embodiments, FIG. 10 is an example schematic diagram of a speech recognition apparatus according to some embodiments of the present disclosure. As shown in FIG. 10, the speech recognition apparatus 100 includes an acquisition unit 110, an encoding unit 120, and a decoding unit 130. The acquisition unit 110 includes circuitry configured to acquire a to-be-recognized speech fragment. The encoding unit 120 includes circuitry configured to encode acquired speech data while the to-be-recognized speech fragment is simultaneously acquired by the acquisition unit 110, to obtain an encoding result of the to-be-recognized speech fragment. The decoding unit 130 includes circuitry configured to decode the encoding result of the to-be-recognized speech fragment to obtain text data corresponding to the to-be-recognized speech fragment.

In some embodiments of the present disclosure, the encoding unit 120 encodes acquired speech data while the acquisition unit 110 simultaneously acquires a to-be-recognized speech fragment, to obtain an encoding result of the to-be-recognized speech fragment. Then the decoding unit 130 decodes the encoding result of the to-be-recognized speech fragment to obtain text data corresponding to the to-be-recognized speech fragment. In other words, an encoder applying a streaming structure and a decoder applying a non-streaming structure are used for performing speech recognition, to enable the encoder to parse an audio stream partially in real time. Such that computing resources can be fully used at both a speech acquisition stage and a decoding stage. Overlapping of time intervals of performing the speech data acquisition and encoding the speech data reduces the time spent at an encoding stage in a speech recognition process. And it thereby reduces a delay of performing the speech recognition in a speech recognition device having limited computing resources.

It should be noted that the speech recognition apparatus of some embodiments of the present disclosure is used for implementing the speech recognition method in some embodiments of the present disclosure, and inherits beneficial effects of the corresponding methods in embodiments of the present disclosure. Details are not repeatedly described herein.

Figure 11:
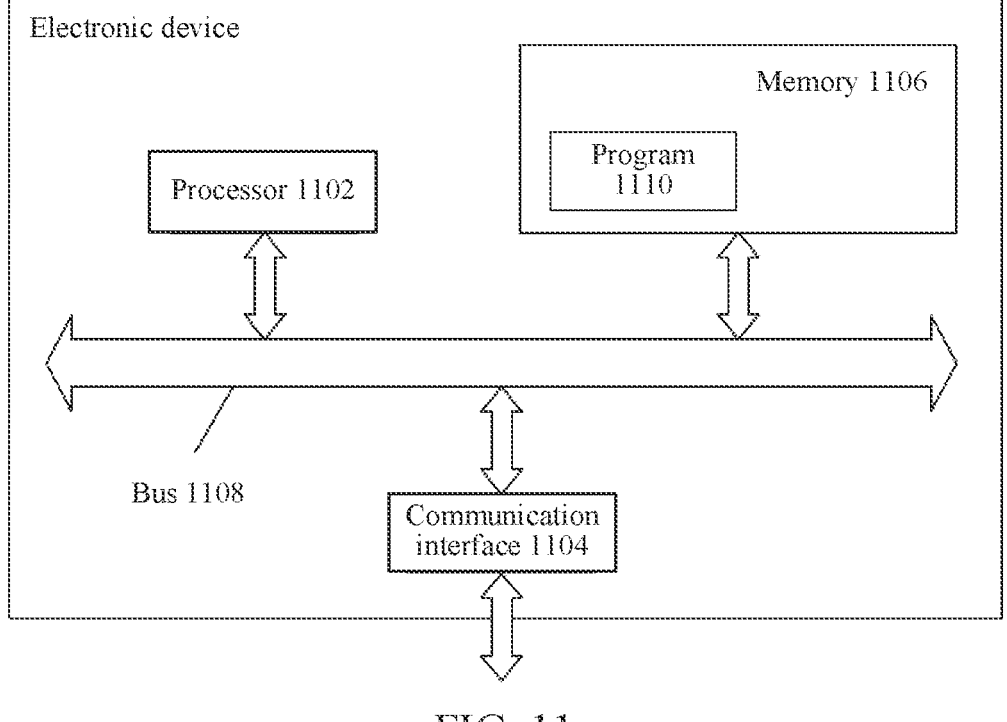
FIG. 11 is a schematic diagram of an example electronic device according to some embodiments of the present disclosure.

FIG. 11 is an example schematic diagram of an electronic device according to some embodiments of the present disclosure. Implementations of the electronic device are not specifically limited in embodiments of the present disclosure. As shown in FIG. 11, the electronic device includes a processor 1102, a communication interface 1104, a memory 1106, and a communication bus 1108. The processor 1102, the communication interface 1104, and the memory 1106 communicate with each other via the communication bus 1108.

The communication interface 1104 includes circuitry configured to communicate with one or more other electronic devices or servers.

The processor 1102 includes circuitry configured to execute a program 1110, and can execute related steps in any one of the foregoing speech recognition methods or the foregoing speech interaction methods in embodiments of the present disclosure.

Specifically, the program 1110 may include program codes that can include a computer operation instruction.

The processor 1102 may be a CPU, an application specific integrated circuit (ASIC), or one or more integrated circuits configured to implement embodiments of the present disclosure. One or more processors included in a smart device may be of the same type, such as one or more CPUs, or may be of different types, such as one or more CPUs and one or more ASICs.

The RISC-V is an open-source instruction set architecture based on a reduced instruction set computer (RISC) principle. The RISC-V can be applied to various aspects such as a single-chip microcomputer chip and an FPGA chip, and can be specifically used in the fields of Internet of Things security, industrial control, mobile phones, personal computers, and the like. In addition, because the RISC-V's designs take the reality requirements of small-scale, fast computation, and low power consumption into considerations, the RISC-V is especially applicable for a modern computing device such as a warehouse-scale cloud computer, a high-end mobile phone, and a small embedded system. With the rising development of the Artificial Intelligence of Things (AIoT), the RISC-V instruction set architecture has also received more attention and support, and is expected to become a widely used next-generation CPU architecture.

The computer operation instructions in some embodiments of the present disclosure may be a computer operation instruction based on the RISC-V instruction set architecture. Correspondingly, the processor 1102 may be designed based on the RISC-V instruction set. Specifically, a chip of the processor in the electronic device disclosed in some embodiments of the present disclosure may be a chip designed using the RISC-V instruction set. And the chip can execute executable codes based on a configured instruction to implement the speech recognition method or the speech interaction method in some embodiments of the present disclosure.

The memory 1106 is configured to store the program 1110. The memory 1106 may include a high-speed random access memory (RAM), or may further include a non-volatile memory, for example, at least one magnetic disk memory.

The program 1110 may be specifically used for enabling the processor 1102 to perform the speech recognition method or the speech interaction method in some embodiments of the present disclosure.

Implementation of steps in the program 1110 may be referred to descriptions of the corresponding steps and units of the speech recognition method or the speech interaction method according to some embodiments of the present disclosure. Details are not repeatedly described herein. A person skilled in the art can clearly understand that for convenience and conciseness of description, for specific working processes of the foregoing devices and modules, reference may be made to the corresponding process descriptions in the foregoing method according to some embodiments of the present disclosure. Details are not repeatedly described herein.

The electronic device in some embodiments of the present disclosure encodes acquired speech data while simultaneously acquiring a to-be-recognized speech fragment, to obtain an encoding result of the to-be-recognized speech fragment, and then decodes the encoding result of the to-be-recognized speech fragment to obtain text data corresponding to the to-be-recognized speech fragment. In other words, an encoder applying a streaming structure and a decoder applying a non-streaming structure are used for performing speech recognition, to enable the encoder to parse an audio stream partially in real time. Such that computing resources can be fully used at both a speech acquisition stage and a decoding stage. Overlapping of time intervals of performing the speech data acquisition and encoding the speech data reduces the time spent at an encoding stage in the speech recognition process, thereby reduces a delay of the speech recognition in the speech recognition device having limited computing resources.

The present disclosure further provides a computer-readable storage medium that stores instructions for enabling a machine to perform the speech recognition method or the speech interaction method as described in some embodiments of the present disclosure. Specifically, a system or an apparatus equipped with a storage medium may be provided, on which software program code implementing the functions in any one of the foregoing embodiments of the present disclosure is stored, and a computer (or a CPU or a MPU) of the system or the apparatus is enabled to load and execute the program code stored in the storage medium.

In this case, the program code loaded from the storage medium may implement the functions in any one of the foregoing embodiments of the present disclosure. Therefore, the program code and the storage medium for storing the program code form a part of the present disclosure.

Storage medium in some embodiments of the present disclosure for providing the program code include a floppy disk, a hard disk, a magneto-optical disk, an optical disk (such as a CD-ROM, a CD-R, a CD-RW, a DVD-ROM, a DVD-RAM, a DVD-RW, or a DVD+RW), a tape, a non-volatile memory card, and a ROM. Optionally, the program code can be downloaded from a server computer through a communication network.

Some embodiments of the present disclosure further provide a computer program product, including computer instructions. The computer instructions instruct a computer device to perform operations corresponding to any one of the plurality of foregoing methods according to some embodiments of the present disclosure.

It should be noted that, according to needs of implementation, each part/step described in embodiments of the present disclosure can be split into more parts/steps, or two or more parts/steps or part of the operations of the part/step can be combined into a new part/step to achieve purposes of embodiments of the present disclosure.

The foregoing methods according to the embodiments of the present disclosure can be implemented in hardware, firmware, or be implemented as software or computer code that can be stored in a recording medium (such as a CD ROM, a RAM, a floppy disk, a hard disk, or a magneto-optical disk), or be implemented as computer code that is downloaded via a network and originally stored in a remote recording medium or a non-transitory machine-readable medium and that is to be stored in a local recording medium. Therefore, the methods described herein can be processed by such software stored on a recording medium using a general-purpose computer, one or more special-purpose processors, or programmable or special-purpose hardware (such as an ASIC or an FPGA). It may be understood that a computer, a processor, a microprocessor controller, or programmable hardware each include a storage component (such as a RAM, a ROM, or a flash memory) that can store or receive software or computer code. When the software or computer code is accessed and executed by the computer, the processor, or the hardware, the methods described herein are implemented. In addition, when the general-purpose computer accesses the code used for implementing the methods shown here, execution of the code transforms the general-purpose computer into a special-purpose computer used for executing the methods shown here.

It should be noted that user information (including but not limited to user device information, user personal information, and the like) and data (including but not limited to data used for analysis, stored data, displayed data, and the like) in embodiments of the present disclosure are all information and data authorized by a user or fully authorized by all parties, and collection, use and processing of relevant data need to comply with relevant laws, regulations and standards of relevant countries and regions. In addition, a corresponding operation entry is provided for the user to choose to authorize or reject.

A person of ordinary skill in the art may understand that units and method steps in the examples described with reference to embodiments of the present disclosure disclosed in this specification can be implemented by electronic hardware or a combination of computer software and electronic hardware. Whether the functions are executed in a mode of hardware or software depends on particular applications and design constraint conditions of the technical solutions. The person skilled in the art may use different methods to implement the described functions for a particular application, but it should not be considered that the implementation goes beyond the scope of embodiments of the present disclosure. As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The embodiments may further be described using the following clauses:

1: A speech recognition method, comprising:
acquiring a to-be-recognized speech fragment;
encoding acquired speech data while simultaneously acquiring the to-be-recognized speech fragment, to obtain an encoding result of the to-be-recognized speech fragment; an decoding the encoding result of the to-be-recognized speech fragment to obtain text data corresponding to the to-be-recognized speech fragment.

2: The method of clause 1, wherein encoding the acquired speech data comprises:
performing feature extraction on an acquired current speech frame to obtain a first feature matrix;
downsampling the first feature matrix to obtain a second feature matrix; an
calculating an encoding result of a current speech frame based on the second feature matrix, wherein the encoding result of the to-be-recognized speech fragment is obtained based on encoding results of a plurality of speech frames comprised in the to-be-recognized speech fragment.

3: The method of clause 2, wherein calculating the encoding result of the current speech frame based on the second feature matrix comprises:
multiplying the second feature matrix respectively with a weight matrix $W^K$, a weight matrix $W^Q$, and a weight matrix $W^V$ to obtain a third feature matrix K, a third feature matrix Q, and a third feature matrix V;
performing a full connection layer operation on the third feature matrix K to obtain a fourth feature matrix K corresponding to the current speech frame;
performing a full connection layer operation on the third feature matrix V to obtain a fourth feature matrix V corresponding to the current speech frame; and
determining the encoding result of the current speech frame based on the third feature matrix Q, the fourth feature matrix K and the fourth feature matrix V that correspond to the current speech frame, and the fourth feature matrix K and the fourth feature matrix V that correspond to a historical speech frame.

4: The method of clause 3, further comprising:
loading, from a first cache, the fourth feature matrix K corresponding to the historical speech frame, wherein the first cache caches the fourth feature matrix K corresponding to at least one first speech frame; and
loading, from a second cache, the fourth feature matrix V corresponding to the historical speech frame, wherein the second cache caches a fourth feature matrix V corresponding to at least one second speech frame.

5: The method of clause 4, further comprising:
caching the fourth feature matrix K that corresponds to the current speech frame to the first cache; and
caching the fourth feature matrix V that corresponds to the current speech frame to the second cache.

6: The method of clause 3, wherein determining the encoding result of the current speech frame based on the third feature matrix Q, the fourth feature matrix K and the fourth feature matrix V that correspond to the current speech frame, and the fourth feature matrix K and the fourth feature matrix V that correspond to the historical speech frame comprises:
splicing the fourth feature matrix K corresponding to the current speech frame and the fourth feature matrix K corresponding to the historical speech frame to obtain a fifth feature matrix K;
splicing the fourth feature matrix V corresponding to the current speech frame and the fourth feature matrix V corresponding to the historical speech frame to obtain a fifth feature matrix V; and
determining the encoding result of the current speech frame based on the third feature matrix Q, the fifth feature matrix K, and the fifth feature matrix V.

7: The method of clause 6, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

8: The method of clause 7, further comprising:

caching the fourth feature matrix K that corresponds to the current speech frame to the first cache; and caching the fourth feature matrix V that corresponds to the current speech frame to the second cache.

9: The method of clause 6, wherein determining the encoding result of the current speech frame based on the third feature matrix Q, the fifth feature matrix K, and the fifth feature matrix V comprises:

calculating a product of the third feature matrix Q and a transposed matrix of the fifth feature matrix K to obtain a sixth feature matrix;

performing normalization on the sixth feature matrix to obtain a seventh feature matrix;

processing the seventh feature matrix using an activation function to obtain an eighth feature matrix;

calculating a product of the eighth feature matrix and the fifth feature matrix V to obtain a ninth feature matrix; and determining the encoding result of the current speech frame based on the ninth feature matrix.

10: The method of clause 9, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

11: The method of clause 10, further comprising:

caching the fourth feature matrix K that corresponds to the current speech frame to the first cache; and caching the fourth feature matrix V that corresponds to the current speech frame to the second cache.

12: A speech interaction method, applied to a smart speaker, the method comprising: acquiring a speech interaction instruction issued by a user;

encoding acquired speech data while simultaneously acquiring the speech interaction instruction, to obtain an encoding result of the speech interaction instruction;

decoding the encoding result of the speech interaction instruction to obtain text data corresponding to the speech interaction instruction; and issuing speech feedback information or performing an interactive action based on the text data corresponding to the speech interaction instruction.

13: The method of clause 12, wherein encoding the acquired speech data comprises: performing feature extraction on an acquired current speech frame to obtain a first feature matrix;

downsampling the first feature matrix to obtain a second feature matrix; and calculating an encoding result of a current speech frame based on the second feature matrix, wherein the encoding result of the speech interaction instruction is obtained based on encoding results of a plurality of speech frames comprised in the speech interaction instruction.

14: The method of clause 13, wherein calculating the encoding result of the current speech frame based on the second feature matrix comprises:

multiplying the second feature matrix respectively with a weight matrix $W^K$, a weight matrix $W^Q$, and a weight matrix $W^V$ to obtain a third feature matrix K, a third feature matrix Q, and a third feature matrix V;

performing a full connection layer operation on the third feature matrix K to obtain a fourth feature matrix K corresponding to the current speech frame;

performing a full connection layer operation on the third feature matrix V to obtain a fourth feature matrix V corresponding to the current speech frame; and determining the encoding result of the current speech frame based on the third feature matrix Q, the fourth feature matrix K and the fourth feature matrix V that correspond to the current speech frame, and the fourth feature matrix K and the fourth feature matrix V that correspond to a historical speech frame.

15: The method of clause 14, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

16: The method of clause 15, further comprising:

caching the fourth feature matrix K that corresponds to the current speech frame to the first cache; and caching the fourth feature matrix V that corresponds to the current speech frame to the second cache.

17: The method of clause 14, wherein determining the encoding result of the current speech frame based on the third feature matrix Q, the fourth feature matrix K and the fourth feature matrix V that correspond to the current speech frame, and the fourth feature matrix K and the fourth feature matrix V that correspond to the historical speech frame comprises:

splicing the fourth feature matrix K corresponding to the current speech frame and the fourth feature matrix K corresponding to the historical speech frame to obtain a fifth feature matrix K;

splicing the fourth feature matrix V corresponding to the current speech frame and the fourth feature matrix V corresponding to the historical speech frame to obtain a fifth feature matrix V; and determining the encoding result of the current speech frame based on the third feature matrix Q, the fifth feature matrix K, and the fifth feature matrix V.

18: The method of clause 17, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

19: The method of clause 18, further comprising:

caching the fourth feature matrix K that corresponds to the current speech frame to the first cache; and caching the fourth feature matrix V that corresponds to the current speech frame to the second cache.

20: The method of clause 17, wherein determining the encoding result of the current speech frame based on the third feature matrix Q, the fifth feature matrix K, and the fifth feature matrix V comprises:

calculating a product of the third feature matrix Q and a transposed matrix of the fifth feature matrix K to obtain a sixth feature matrix;

performing normalization on the sixth feature matrix to obtain a seventh feature matrix;

processing the seventh feature matrix using an activation function to obtain an eighth feature matrix;

calculating a product of the eighth feature matrix and the fifth feature matrix V to obtain a ninth feature matrix; and determining the encoding result of the current speech frame based on the ninth feature matrix.

21: The method of clause 20, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

22: The method of clause 21, further comprising:

caching the fourth feature matrix K that corresponds to the current speech frame to the first cache; and caching the fourth feature matrix V that corresponds to the current speech frame to the second cache.

23: A speech interaction method, applied to an advertising machine, the method comprising:

acquiring a speech interaction instruction issued by a user;

encoding acquired speech data while simultaneously acquiring the speech interaction instruction, to obtain an encoding result of the speech interaction instruction;

decoding the encoding result of the speech interaction instruction to obtain text data corresponding to the speech interaction instruction; and issuing speech feedback information or playing back a feedback image based on the text data corresponding to the speech interaction instruction.

24: The method of clause 23, wherein encoding the acquired speech data comprises: performing feature extraction on an acquired current speech frame to obtain a first feature matrix;

downsampling the first feature matrix to obtain a second feature matrix; and calculating an encoding result of a current speech frame based on the second feature matrix, wherein the encoding result of the speech interaction instruction is obtained based on encoding results of a plurality of speech frames comprised in the speech interaction instruction.

25: The method of clause 24, wherein calculating the encoding result of the current speech frame based on the second feature matrix comprises:

multiplying the second feature matrix respectively with a weight matrix $W^K$, a weight matrix $W^Q$, and a weight matrix $W^V$ to obtain a third feature matrix K, a third feature matrix Q, and a third feature matrix V;

performing a full connection layer operation on the third feature matrix K to obtain a fourth feature matrix K corresponding to the current speech frame;

performing a full connection layer operation on the third feature matrix V to obtain a fourth feature matrix V corresponding to the current speech frame; and determining the encoding result of the current speech frame based on the third feature matrix Q, the fourth feature matrix K and the fourth feature matrix V that correspond to the current speech frame, and the fourth feature matrix K and the fourth feature matrix V that correspond to a historical speech frame.

26: The method of clause 25, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

27: The method of clause 26, further comprising:

caching the fourth feature matrix K that corresponds to the current speech frame to the first cache; and caching the fourth feature matrix V that corresponds to the current speech frame to the second cache.

28: The method of clause 25, wherein determining the encoding result of the current speech frame based on the third feature matrix Q, the fourth feature matrix K and the fourth feature matrix V that correspond to the current speech frame, and the fourth feature matrix K and the fourth feature matrix V that correspond to the historical speech frame comprises:

splicing the fourth feature matrix K corresponding to the current speech frame and the fourth feature matrix K corresponding to the historical speech frame to obtain a fifth feature matrix K;

splicing the fourth feature matrix V corresponding to the current speech frame and the fourth feature matrix V corresponding to the historical speech frame to obtain a fifth feature matrix V; and determining the encoding result of the current speech frame based on the third feature matrix Q, the fifth feature matrix K, and the fifth feature matrix V.

29: The method of clause 28, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

30: The method of clause 29, further comprising:

caching the fourth feature matrix K that corresponds to the current speech frame to the first cache; and caching the fourth feature matrix V that corresponds to the current speech frame to the second cache.

31: The method of clause 28, wherein determining the encoding result of the current speech frame based on the third feature matrix Q, the fifth feature matrix K, and the fifth feature matrix V comprises:

calculating a product of the third feature matrix Q and a transposed matrix of the fifth feature matrix K to obtain a sixth feature matrix;

performing normalization on the sixth feature matrix to obtain a seventh feature matrix;

processing the seventh feature matrix using an activation function to obtain an eighth feature matrix;

calculating a product of the eighth feature matrix and the fifth feature matrix V to obtain a ninth feature matrix; and determining the encoding result of the current speech frame based on the ninth feature matrix.

32: The method of clause 31, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

33: The method of clause 32, further comprising:

caching the fourth feature matrix K that corresponds to the current speech frame to the first cache; and caching the fourth feature matrix V that corresponds to the current speech frame to the second cache.

34: A speech recognition apparatus, comprising:

an acquisition unit having circuitry configured to acquire a to-be-recognized speech fragment;

an encoding unit having circuitry configured to encode acquired speech data while the acquisition unit simultaneously acquires the to-be-recognized speech fragment, to obtain an encoding result of the to-be-recognized speech fragment; and a decoding unit having circuitry configured to decode the encoding result of the to-be-recognized speech fragment to obtain text data corresponding to the to-be-recognized speech fragment.

35: The speech recognition apparatus of clause 34, wherein the circuitry of the encoding unit is further configured to perform feature extraction on an acquired current speech frame to obtain a first feature matrix, downsample the first feature matrix to obtain a second feature matrix; and calculate an encoding result of a current speech frame based on the second feature matrix, wherein the circuitry of the encoding unit is further configured to obtain the encoding result of the to-be-recognized speech fragment based on encoding results of a plurality of speech frames comprised in the to-be-recognized speech fragment.

36: The speech recognition apparatus of clause 35, wherein the circuitry of the encoding unit is further configured to multiply the second feature matrix respectively with a weight matrix $W^K$, a weight matrix $W^Q$, and a weight matrix $W^V$ to obtain a third feature matrix K, a third feature matrix Q, and a third feature matrix V, perform a full connection layer operation on the third feature matrix K to obtain a fourth feature matrix K corresponding to the current speech frame, perform a full connection layer operation on the third feature matrix V to obtain a fourth feature matrix V corresponding to the current speech frame, and determine the encoding result of the current speech frame based on the third feature matrix Q, the fourth feature matrix K and the fourth feature matrix V that correspond to the current speech frame, and the fourth feature matrix K and the fourth feature matrix V that correspond to a historical speech frame.

37: The speech recognition apparatus of clause 36, wherein the circuitry of the encoding unit is further configured to load, from a first cache, the fourth feature matrix K corresponding to the historical speech frame, and is further configured to loading, from a second cache, the fourth feature matrix V corresponding to the historical speech frame;

wherein the first cache caches the fourth feature matrix K corresponding to at least one first speech frame; and wherein the second cache caches a fourth feature matrix V corresponding to at least one second speech frame.

38: The speech recognition apparatus of clause 37, wherein the circuitry of the encoding unit is further configured to cache the fourth feature matrix K that corresponds to the current speech frame to the first cache, and is further configured to cache the fourth feature matrix V that corresponds to the current speech frame to the second cache.

39: The speech recognition apparatus of clause 36, wherein the circuitry of the encoding unit is further configured to splice the fourth feature matrix K corresponding to the current speech frame and the fourth feature matrix K corresponding to the historical speech frame to obtain a fifth feature matrix K, splice the fourth feature matrix V corresponding to the current speech frame and the fourth feature matrix V corresponding to the historical speech frame to obtain a fifth feature matrix V, and determine the encoding result of the current speech frame based on the third feature matrix Q, the fifth feature matrix K, and the fifth feature matrix V.

40: The speech recognition apparatus of clause 39, wherein the circuitry of the encoding unit is further configured to load, from a first cache, the fourth feature matrix K corresponding to the historical speech frame, and is further configured to load, from a second cache, the fourth feature matrix V corresponding to the historical speech frame;

wherein the first cache caches the fourth feature matrix K corresponding to at least one first speech frame; and wherein the second cache caches a fourth feature matrix V corresponding to at least one second speech frame.

41: The speech recognition apparatus of clause 40, wherein the circuitry of the encoding unit is further configured to cache the fourth feature matrix K that corresponds to the current speech frame to the first cache, and cache the fourth feature matrix V that corresponds to the current speech frame to the second cache.

42: The speech recognition apparatus of clause 39, wherein the circuitry of the encoding unit is further configured to calculate a product of the third feature matrix Q and a transposed matrix of the fifth feature matrix K to obtain a sixth feature matrix, perform normalization on the sixth feature matrix to obtain a seventh feature matrix, process the seventh feature matrix using an activation function to obtain an eighth feature matrix, calculate a product of the eighth feature matrix and the fifth feature matrix V to obtain a ninth feature matrix, and determine the encoding result of the current speech frame based on the ninth feature matrix.

43: The speech recognition apparatus of clause 42, wherein the circuitry of the encoding unit is further configured to load, from a first cache, the fourth feature matrix K corresponding to the historical speech frame, and is further configured to load, from a second cache, the fourth feature matrix V corresponding to the historical speech frame;

wherein the first cache caches the fourth feature matrix K corresponding to at least one first speech frame; and wherein the second cache caches a fourth feature matrix V corresponding to at least one second speech frame.

44: The speech recognition apparatus of clause 43, wherein the circuitry of the encoding unit is further configured to cache the fourth feature matrix K that corresponds to the current speech frame to the first cache, and cache the fourth feature matrix V that corresponds to the current speech frame to the second cache.

45: An electronic device, comprising: one or more processors, a memory, a communication interface, and a communication bus, wherein the one or more processors, the memory, and the communication interface communicate with each other via the communication bus, the memory is configured to store at least one executable instruction, and the executable instruction enables the one or more processors to cause the electronic device to perform operations corresponding to perform operations comprising:

acquiring a to-be-recognized speech fragment;

encoding acquired speech data while simultaneously acquiring the to-be-recognized speech fragment, to obtain an encoding result of the to-be-recognized speech fragment; and decoding the encoding result of the to-be-recognized speech fragment to obtain text data corresponding to the to-be-recognized speech fragment.

46: The electronic device of clause 45, wherein the operation of encoding the acquired speech data comprise:

performing feature extraction on an acquired current speech frame to obtain a first feature matrix;

downsampling the first feature matrix to obtain a second feature matrix; and calculating an encoding result of a current speech frame based on the second feature matrix, wherein the encoding result of the to-be-recognized speech fragment is obtained based on encoding results of a plurality of speech frames comprised in the to-be-recognized speech fragment.

47: The electronic device of clause 46, wherein the operation of calculating the encoding result of the current speech frame based on the second feature matrix comprise:

multiplying the second feature matrix respectively with a weight matrix $W^K$, a weight matrix $W^Q$, and a weight matrix $W^V$ to obtain a third feature matrix K, a third feature matrix Q, and a third feature matrix V;

performing a full connection layer operation on the third feature matrix K to obtain a fourth feature matrix K corresponding to the current speech frame;

performing a full connection layer operation on the third feature matrix V to obtain a fourth feature matrix V corresponding to the current speech frame; and determining the encoding result of the current speech frame based on the third feature matrix Q, the fourth feature matrix K and the fourth feature matrix V that correspond to the current speech frame, and the fourth feature matrix K and the fourth feature matrix V that correspond to a historical speech frame.

48: The electronic device of clause 47, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

49: The electronic device of clause 48, wherein the operations further comprise:

caching the fourth feature matrix K that corresponds to the current speech frame to the first cache; and caching the fourth feature matrix V that corresponds to the current speech frame to the second cache.

50: The electronic device of clause 47, wherein the operation of determining the encoding result of the current speech frame based on the third feature matrix Q, the fourth feature matrix K and the fourth feature matrix V that correspond to the current speech frame, and the fourth feature matrix K and the fourth feature matrix V that correspond to the historical speech frame comprise:

splicing the fourth feature matrix K corresponding to the current speech frame and the fourth feature matrix K corresponding to the historical speech frame to obtain a fifth feature matrix K;

splicing the fourth feature matrix V corresponding to the current speech frame and the fourth feature matrix V corresponding to the historical speech frame to obtain a fifth feature matrix V; and determining the encoding result of the current speech frame based on the third feature matrix Q, the fifth feature matrix K, and the fifth feature matrix V.

51: The electronic device of clause 50, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

52: The electronic device of clause 51, wherein the operations further comprise:

caching the fourth feature matrix K that corresponds to the current speech frame to the first cache; and caching the fourth feature matrix V that corresponds to the current speech frame to the second cache.

53: The electronic device of clause 50, wherein the operation of determining the encoding result of the current speech frame based on the third feature matrix Q, the fifth feature matrix K, and the fifth feature matrix V comprise:

calculating a product of the third feature matrix Q and a transposed matrix of the fifth feature matrix K to obtain a sixth feature matrix;

performing normalization on the sixth feature matrix to obtain a seventh feature matrix;

processing the seventh feature matrix using an activation function to obtain an eighth feature matrix;

calculating a product of the eighth feature matrix and the fifth feature matrix V to obtain a ninth feature matrix; and determining the encoding result of the current speech frame based on the ninth feature matrix.

54: The electronic device of clause 53, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

55: The electronic device of clause 54, wherein the operations further comprise:

caching the fourth feature matrix K that corresponds to the current speech frame to the first cache; and caching the fourth feature matrix V that corresponds to the current speech frame to the second cache.

56: An electronic device comprising: one or more processors, a memory, a communication interface, and a communication bus, wherein the one or more processors, the memory, and the communication interface communicate with each other via the communication bus, the memory is configured to store at least one executable instruction, and the executable instruction enables the one or more processors to cause the electronic device to perform operations comprising:

acquiring a speech interaction instruction issued by a user;

encoding acquired speech data while simultaneously acquiring the speech interaction instruction, to obtain an encoding result of the speech interaction instruction;

decoding the encoding result of the speech interaction instruction to obtain text data corresponding to the speech interaction instruction; and issuing speech feedback information or performing an interactive action based on the text data corresponding to the speech interaction instruction.

57: An electronic device comprising: one or more processors, a memory, a communication interface, and a communication bus, wherein the one or more processors, the memory, and the communication interface communicate with each other via the communication bus, the memory is configured to store at least one executable instruction, and the executable instruction enables the one or more processors to cause the electronic device to perform operations comprising:

acquiring a speech interaction instruction issued by a user;

encoding acquired speech data while simultaneously acquiring the speech interaction instruction, to obtain an encoding result of the speech interaction instruction;

decoding the encoding result of the speech interaction instruction to obtain text data corresponding to the speech interaction instruction; and issuing speech feedback information or playing back a feedback image based on the text data corresponding to the speech interaction instruction.

58. A non-transitory computer-readable storage medium that stored a computer program that are executable by one or more processors of a device to cause the device to perform operations of a speech recognition method applied to a smart speaker, the operations comprising:

acquiring a to-be-recognized speech fragment;

encoding acquired speech data while simultaneously acquiring the to-be-recognized speech fragment, to obtain an encoding result of the to-be-recognized speech fragment; and decoding the encoding result of the to-be-recognized speech fragment to obtain text data corresponding to the to-be-recognized speech fragment.

59: The non-transitory computer-readable storage medium of clause 58, wherein the operation of encoding the acquired speech data comprises:

performing feature extraction on an acquired current speech frame to obtain a first feature matrix;

downsampling the first feature matrix to obtain a second feature matrix; and calculating an encoding result of a current speech frame based on the second feature matrix, wherein the encoding result of the to-be-recognized speech fragment is obtained based on encoding results of a plurality of speech frames comprised in the to-be-recognized speech fragment.

60: The non-transitory computer-readable storage medium of clause 59, wherein the operation of calculating the encoding result of the current speech frame based on the second feature matrix comprise:

multiplying the second feature matrix respectively with a weight matrix $W^K$, a weight matrix $W^Q$, and a weight matrix $W^V$ to obtain a third feature matrix K, a third feature matrix Q, and a third feature matrix V;

performing a full connection layer operation on the third feature matrix K to obtain a fourth feature matrix K corresponding to the current speech frame;

performing a full connection layer operation on the third feature matrix V to obtain a fourth feature matrix V corresponding to the current speech frame; and determining the encoding result of the current speech frame based on the third feature matrix Q, the fourth feature matrix K and the fourth feature matrix V that correspond to the current speech frame, and the fourth feature matrix K and the fourth feature matrix V that correspond to a historical speech frame.

61: The non-transitory computer-readable storage medium of clause 60, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

62: The non-transitory computer-readable storage medium of clause 61, wherein the operations further comprise:

caching the fourth feature matrix K that corresponds to the current speech frame to the first cache; and caching the fourth feature matrix V that corresponds to the current speech frame to the second cache.

63: The non-transitory computer-readable storage medium of clause 60, wherein the operation of determining the encoding result of the current speech frame based on the third feature matrix Q, the fourth feature matrix K and the fourth feature matrix V that correspond to the current speech frame, and the fourth feature matrix K and the fourth feature matrix V that correspond to the historical speech frame comprises:

splicing the fourth feature matrix K corresponding to the current speech frame and the fourth feature matrix K corresponding to the historical speech frame to obtain a fifth feature matrix K;

splicing the fourth feature matrix V corresponding to the current speech frame and the fourth feature matrix V corresponding to the historical speech frame to obtain a fifth feature matrix V; and determining the encoding result of the current speech frame based on the third feature matrix Q, the fifth feature matrix K, and the fifth feature matrix V.

64: The non-transitory computer-readable storage medium of clause 63, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

65: The non-transitory computer-readable storage medium of clause 64, wherein the operations further comprise:

caching the fourth feature matrix K that corresponds to the current speech frame to the first cache; and caching the fourth feature matrix V that corresponds to the current speech frame to the second cache.

66: The non-transitory computer-readable storage medium of clause 63, wherein the operation of determining the encoding result of the current speech frame based on the third feature matrix Q, the fifth feature matrix K, and the fifth feature matrix V comprises:

calculating a product of the third feature matrix Q and a transposed matrix of the fifth feature matrix K to obtain a sixth feature matrix;

performing normalization on the sixth feature matrix to obtain a seventh feature matrix;

processing the seventh feature matrix using an activation function to obtain an eighth feature matrix;

calculating a product of the eighth feature matrix and the fifth feature matrix V to obtain a ninth feature matrix; and determining the encoding result of the current speech frame based on the ninth feature matrix.

67: The non-transitory computer-readable storage medium of clause 66, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

68: The non-transitory computer-readable storage medium of clause 67, wherein the operations further comprise:

caching the fourth feature matrix K that corresponds to the current speech frame to the first cache; and caching the fourth feature matrix V that corresponds to the current speech frame to the second cache.

69: A non-transitory computer-readable storage medium that stored a computer program that are executable by one or more processors of a device to cause the device to perform operations of a speech interaction method, the operations comprising:

acquiring a speech interaction instruction issued by a user;

encoding acquired speech data while simultaneously acquiring the speech interaction instruction, to obtain an encoding result of the speech interaction instruction;

decoding the encoding result of the speech interaction instruction to obtain text data corresponding to the speech interaction instruction; and issuing speech feedback information or performing an interactive action based on the text data corresponding to the speech interaction instruction.

70: A non-transitory computer-readable storage medium that stored a computer program that are executable by one or more processors of a device to cause the device to perform operations of a speech interaction method applied to an advertising machine, the operations comprising:

acquiring a speech interaction instruction issued by a user;

encoding acquired speech data while simultaneously acquiring the speech interaction instruction, to obtain an encoding result of the speech interaction instruction;

decoding the encoding result of the speech interaction instruction to obtain text data corresponding to the speech interaction instruction; and issuing speech feedback information or playing back a feedback image based on the text data corresponding to the speech interaction instruction.

71: A computer program product, wherein the computer program product comprises computer instructions, and the computer instructions instruct a computing device to perform operations corresponding to a speech recognition method, the operations comprising: acquiring a to-be-recognized speech fragment;

encoding acquired speech data while simultaneously acquiring the to-be-recognized speech fragment, to obtain an encoding result of the to-be-recognized speech fragment; and decoding the encoding result of the to-be-recognized speech fragment to obtain text data corresponding to the to-be-recognized speech fragment.

72: The computer program product of clause 71, wherein the operation of encoding the acquired speech data comprises:

performing feature extraction on an acquired current speech frame to obtain a first feature matrix;

downsampling the first feature matrix to obtain a second feature matrix; and calculating an encoding result of a current speech frame based on the second feature matrix, wherein the encoding result of the to-be-recognized speech fragment is obtained based on encoding results of a plurality of speech frames comprised in the to-be-recognized speech fragment.

73: The computer program product of clause 72, wherein the operation of calculating the encoding result of the current speech frame based on the second feature matrix comprises:

multiplying the second feature matrix respectively with a weight matrix $W^K$, a weight matrix $W^Q$, and a weight matrix $W^V$ to obtain a third feature matrix K, a third feature matrix Q, and a third feature matrix V;

performing a full connection layer operation on the third feature matrix K to obtain a fourth feature matrix K corresponding to the current speech frame;

performing a full connection layer operation on the third feature matrix V to obtain a fourth feature matrix V corresponding to the current speech frame; and determining the encoding result of the current speech frame based on the third feature matrix Q, the fourth feature matrix K and the fourth feature matrix V that correspond to the current speech frame, and the fourth feature matrix K and the fourth feature matrix V that correspond to a historical speech frame.

74: The computer program product of clause 73, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

75: The computer program product of clause 74, wherein the operations further comprise:

caching the fourth feature matrix K that corresponds to the current speech frame to the first cache; and caching the fourth feature matrix V that corresponds to the current speech frame to the second cache.

76: The computer program product of clause 73, wherein the operation of determining the encoding result of the current speech frame based on the third feature matrix Q, the fourth feature matrix K and the fourth feature matrix V that correspond to the current speech frame, and the fourth feature matrix K and the fourth feature matrix V that correspond to the historical speech frame comprises:

splicing the fourth feature matrix K corresponding to the current speech frame and the fourth feature matrix K corresponding to the historical speech frame to obtain a fifth feature matrix K;

splicing the fourth feature matrix V corresponding to the current speech frame and the fourth feature matrix V corresponding to the historical speech frame to obtain a fifth feature matrix V; and determining the encoding result of the current speech frame based on the third feature matrix Q, the fifth feature matrix K, and the fifth feature matrix V.

77: The computer program product of clause 76, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

78: The computer program product of clause 77, wherein the operations further comprise:

caching the fourth feature matrix K that corresponds to the current speech frame to the first cache; and caching the fourth feature matrix V that corresponds to the current speech frame to the second cache.

79: The computer program product of clause 76, wherein the operation of determining the encoding result of the current speech frame based on the third feature matrix Q, the fifth feature matrix K, and the fifth feature matrix V comprises:

calculating a product of the third feature matrix Q and a transposed matrix of the fifth feature matrix K to obtain a sixth feature matrix;

performing normalization on the sixth feature matrix to obtain a seventh feature matrix;

processing the seventh feature matrix using an activation function to obtain an eighth feature matrix;

calculating a product of the eighth feature matrix and the fifth feature matrix V to obtain a ninth feature matrix; and determining the encoding result of the current speech frame based on the ninth feature matrix.

80: The computer program product of clause 79, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

81: The computer program product of clause 80, wherein the operations further comprise:

caching the fourth feature matrix K that corresponds to the current speech frame to the first cache; and caching the fourth feature matrix V that corresponds to the current speech frame to the second cache.

82: A computer program product, wherein the computer program product comprises computer instructions, and the computer instructions instruct a computing device to perform operations corresponding to a speech interaction method, the operations comprising:

acquiring a speech interaction instruction issued by a user;

encoding acquired speech data while simultaneously acquiring the speech interaction instruction, to obtain an encoding result of the speech interaction instruction;

decoding the encoding result of the speech interaction instruction to obtain text data corresponding to the speech interaction instruction; and issuing speech feedback information or performing an interactive action based on the text data corresponding to the speech interaction instruction.

83: A computer program product, wherein the computer program product comprises computer instructions, and the computer instructions instruct a computing device to perform operations corresponding to a speech interaction method, the operations comprising:

acquiring a speech interaction instruction issued by a user;

encoding acquired speech data while simultaneously acquiring the speech interaction instruction, to obtain an encoding result of the speech interaction instruction;

decoding the encoding result of the speech interaction instruction to obtain text data corresponding to the speech interaction instruction; and issuing speech feedback information or playing back a feedback image based on the text data corresponding to the speech interaction instruction.

The foregoing embodiments are merely used to describe embodiments of the present disclosure, but are not intended to limit the embodiments of the present disclosure. The person of ordinary skill in the art can also make various modifications without departing from the spirit and scope of the embodiments of the present disclosure. Therefore, all equivalent technical solutions also fall within the scope of the embodiments of the present disclosure. The scope of patent protection of the embodiments of the present disclosure should be defined by the claims.

What is claimed is:

1. An electronic device, comprising: one or more processors, a memory, a communication interface, and a communication bus, wherein the one or more processors, the memory, and the communication interface communicate with each other via the communication bus, the memory is configured to store at least one executable instruction, and the executable instruction enables the one or more processors to cause the electronic device to perform operations corresponding to perform operations comprising:

acquiring a to-be-recognized speech fragment;

encoding acquired speech data while simultaneously acquiring the to-be-recognized speech fragment, to obtain an encoding result of the to-be-recognized speech fragment; and decoding the encoding result of the to-be-recognized speech fragment to obtain text data corresponding to the to-be-recognized speech fragment;

wherein encoding the acquired speech data further comprises:

performing feature extraction on an acquired current speech frame to obtain a first feature matrix;

downsampling the first feature matrix to obtain a second feature matrix; and calculating an encoding result of a current speech frame based on the second feature matrix, wherein the encoding result of the to-be-recognized speech fragment is obtained based on encoding results of a plurality of speech frames comprised in the to-be-recognized speech fragment;

wherein calculating the encoding result of the current speech frame based on the second feature matrix comprises:

multiplying the second feature matrix respectively with a weight matrix $W^K$, a weight matrix $W^Q$, and a weight matrix $W^V$ to obtain a third feature matrix K, a third feature matrix Q, and a third feature matrix V;

performing a full connection layer operation on the third feature matrix K to obtain a fourth feature matrix K corresponding to the current speech frame;

performing a full connection layer operation on the third feature matrix V to obtain a fourth feature matrix V corresponding to the current speech frame;

determining the encoding result of the current speech frame based on the third feature matrix Q, the fourth feature matrix K and the fourth feature matrix V that correspond to the current speech frame, and the fourth feature matrix K and the fourth feature matrix V that correspond to a historical speech frame.

2. The electronic device of claim 1, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

3. The electronic device of claim 2, wherein the operations further comprise:

caching the fourth feature matrix K that corresponds to the current speech frame to the first cache; and caching the fourth feature matrix V that corresponds to the current speech frame to the second cache.

4. The electronic device of claim 1, wherein the operation of determining the encoding result of the current speech frame based on the third feature matrix Q, the fourth feature matrix K and the fourth feature matrix V that correspond to the current speech frame, and the fourth feature matrix K and the fourth feature matrix V that correspond to the historical speech frame comprises:

splicing the fourth feature matrix K corresponding to the current speech frame and the fourth feature matrix K corresponding to the historical speech frame to obtain a fifth feature matrix K;

splicing the fourth feature matrix V corresponding to the current speech frame and the fourth feature matrix V corresponding to the historical speech frame to obtain a fifth feature matrix V; and determining the encoding result of the current speech frame based on the third feature matrix Q, the fifth feature matrix K, and the fifth feature matrix V.

5. The electronic device of claim 4, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

6. The electronic device of claim 5, wherein the operations further comprise:

caching the fourth feature matrix K that corresponds to the current speech frame to the first cache; and caching the fourth feature matrix V that corresponds to the current speech frame to the second cache.

7. The electronic device of claim 4, wherein the operation of determining the encoding result of the current speech frame based on the third feature matrix Q, the fifth feature matrix K, and the fifth feature matrix V comprise:

calculating a product of the third feature matrix Q and a transposed matrix of the fifth feature matrix K to obtain a sixth feature matrix;

performing normalization on the sixth feature matrix to obtain a seventh feature matrix;

processing the seventh feature matrix using an activation function to obtain an eighth feature matrix;

calculating a product of the eighth feature matrix and the fifth feature matrix V to obtain a ninth feature matrix; and determining the encoding result of the current speech frame based on the ninth feature matrix.

8. The electronic device of claim 7, wherein the operations further comprise:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

9. The electronic device of claim 8, wherein the operations further comprise:

caching the fourth feature matrix K that corresponds to the current speech frame to the first cache; and caching the fourth feature matrix V that corresponds to the current speech frame to the second cache.

10. A speech recognition method, comprising:

acquiring a to-be-recognized speech fragment;

encoding acquired speech data while simultaneously acquiring the to-be-recognized speech fragment, to obtain an encoding result of the to-be-recognized speech fragment; and decoding the encoding result of the to-be-recognized speech fragment to obtain text data corresponding to the to-be-recognized speech fragment;

wherein encoding the acquired speech data further comprises:

performing feature extraction on an acquired current speech frame to obtain a first feature matrix;

downsampling the first feature matrix to obtain a second feature matrix; and calculating an encoding result of a current speech frame based on the second feature matrix, wherein the encoding result of the to-be-recognized speech fragment is obtained based on encoding results of a plurality of speech frames comprised in the to-be-recognized speech fragment;

wherein calculating the encoding result of the current speech frame based on the second feature matrix comprise:

multiplying the second feature matrix respectively with a weight matrix $W^K$, a weight matrix $W^Q$, and a weight matrix $W^V$ to obtain a third feature matrix K, a third feature matrix Q, and a third feature matrix V;

performing a full connection layer operation on the third feature matrix K to obtain a fourth feature matrix K corresponding to the current speech frame;

performing a full connection layer operation on the third feature matrix V to obtain a fourth feature matrix V corresponding to the current speech frame;

determining the encoding result of the current speech frame based on the third feature matrix Q, the fourth feature matrix K and the fourth feature matrix V that correspond to the current speech frame, and the fourth feature matrix K and the fourth feature matrix V that correspond to a historical speech frame.

11. The method of claim 10, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

12. The method of claim 11, further comprising:

caching the fourth feature matrix K that corresponds to the current speech frame to the first cache; and caching the fourth feature matrix V that corresponds to the current speech frame to the second cache.

13. The method of claim 10, wherein determining the encoding result of the current speech frame based on the third feature matrix Q, the fourth feature matrix K and the fourth feature matrix V that correspond to the current speech frame, and the fourth feature matrix K and the fourth feature matrix V that correspond to the historical speech frame comprises:

splicing the fourth feature matrix K corresponding to the current speech frame and the fourth feature matrix K corresponding to the historical speech frame to obtain a fifth feature matrix K;

splicing the fourth feature matrix V corresponding to the current speech frame and the fourth feature matrix V corresponding to the historical speech frame to obtain a fifth feature matrix V; and determining the encoding result of the current speech frame based on the third feature matrix Q, the fifth feature matrix K, and the fifth feature matrix V.

14. The method of claim 13, wherein determining the encoding result of the current speech frame based on the third feature matrix Q, the fifth feature matrix K, and the fifth feature matrix V comprises:

calculating a product of the third feature matrix Q and a transposed matrix of the fifth feature matrix K to obtain a sixth feature matrix;

performing normalization on the sixth feature matrix to obtain a seventh feature matrix;

processing the seventh feature matrix using an activation function to obtain an eighth feature matrix;

calculating a product of the eighth feature matrix and the fifth feature matrix V to obtain a ninth feature matrix; and determining the encoding result of the current speech frame based on the ninth feature matrix.

15. A speech interaction method, applied to a smart speaker, the method comprising:

acquiring a speech interaction instruction issued by a user;

encoding acquired speech data while simultaneously acquiring the speech interaction instruction, to obtain an encoding result of the speech interaction instruction;

decoding the encoding result of the speech interaction instruction to obtain text data corresponding to the speech interaction instruction; and issuing speech feedback information or performing an interactive action based on the text data corresponding to the speech interaction instruction;

wherein encoding the acquired speech data further comprises:

performing feature extraction on an acquired current speech frame to obtain a first feature matrix;

downsampling the first feature matrix to obtain a second feature matrix; and calculating an encoding result of a current speech frame based on the second feature matrix, wherein the encoding result of the speech data is obtained based on encoding results of a plurality of speech frames comprised in the speech data;

wherein calculating the encoding result of the current speech frame based on the second feature matrix comprise:

multiplying the second feature matrix respectively with a weight matrix $W^K$, a weight matrix $W^Q$, and a weight matrix $W^V$ to obtain a third feature matrix K, a third feature matrix Q, and a third feature matrix V;

performing a full connection layer operation on the third feature matrix K to obtain a fourth feature matrix K corresponding to the current speech frame;

performing a full connection layer operation on the third feature matrix V to obtain a fourth feature matrix V corresponding to the current speech frame;

determining the encoding result of the current speech frame based on the third feature matrix Q, the fourth feature matrix K and the fourth feature matrix V that correspond to the current speech frame, and the fourth feature matrix K and the fourth feature matrix V that correspond to a historical speech frame.

16. The method of claim 15, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

17. The method of claim 16, further comprising:

caching the fourth feature matrix K that corresponds to the current speech frame to the first cache; and caching the fourth feature matrix V that corresponds to the current speech frame to the second cache.

18. The method of claim 15, wherein determining the encoding result of the current speech frame based on the third feature matrix Q, the fourth feature matrix K and the fourth feature matrix V that correspond to the current speech frame, and the fourth feature matrix K and the fourth feature matrix V that correspond to the historical speech frame comprises:

splicing the fourth feature matrix K corresponding to the current speech frame and the fourth feature matrix K corresponding to the historical speech frame to obtain a fifth feature matrix K;

splicing the fourth feature matrix V corresponding to the current speech frame and the fourth feature matrix V corresponding to the historical speech frame to obtain a fifth feature matrix V; and determining the encoding result of the current speech frame based on the third feature matrix Q, the fifth feature matrix K, and the fifth feature matrix V.

19. The method of claim 18, wherein determining the encoding result of the current speech frame based on the third feature matrix Q, the fifth feature matrix K, and the fifth feature matrix V comprises:

calculating a product of the third feature matrix Q and a transposed matrix of the fifth feature matrix K to obtain a sixth feature matrix;

performing normalization on the sixth feature matrix to obtain a seventh feature matrix;

processing the seventh feature matrix using an activation function to obtain an eighth feature matrix;

calculating a product of the eighth feature matrix and the fifth feature matrix V to obtain a ninth feature matrix; and determining the encoding result of the current speech frame based on the ninth feature matrix.

20. The method of claim 18, further comprising:

loading, from a first cache, the fourth feature matrix K corresponding to the historical speech frame, wherein the first cache caches the fourth feature matrix K corresponding to at least one first speech frame; and loading, from a second cache, the fourth feature matrix V corresponding to the historical speech frame, wherein the second cache caches a fourth feature matrix V corresponding to at least one second speech frame.

* * * * *